United States Patent [19]

Sudo et al.

[11] Patent Number: 6,087,807
[45] Date of Patent: Jul. 11, 2000

[54] CHARGE/DISCHARGE CONTROL CIRCUIT AND CHARGEABLE ELECTRIC POWER SOURCE APPARATUS

[75] Inventors: Minoru Sudo; Takayuki Takashina; Yoshikazu Kojima; Sadashi Shimoda; Hiroshi Mukainakano, all of Tokyo, Japan

[73] Assignee: Seiko Instruments Inc., Japan

[21] Appl. No.: 09/094,037

[22] Filed: Jun. 9, 1998

Related U.S. Application Data

[62] Division of application No. 08/816,196, Mar. 12, 1997, Pat. No. 5,841,265.

[30] Foreign Application Priority Data

| Nov. 24, 1992 | [JP] | Japan | 4-313515 |
|---|---|---|---|
| Jan. 12, 1993 | [JP] | Japan | 5-3561 |
| Mar. 11, 1993 | [JP] | Japan | 5-51110 |
| Mar. 12, 1993 | [JP] | Japan | 5-52476 |
| Mar. 16, 1993 | [JP] | Japan | 5-56208 |
| Mar. 17, 1993 | [JP] | Japan | 5-57563 |
| Mar. 17, 1993 | [JP] | Japan | 5-57564 |
| Mar. 22, 1993 | [JP] | Japan | 5-62259 |
| Mar. 22, 1993 | [JP] | Japan | 5-62260 |
| Mar. 24, 1993 | [JP] | Japan | 5-65758 |
| Mar. 25, 1993 | [JP] | Japan | 5-67132 |
| Apr. 21, 1993 | [JP] | Japan | 5-94677 |
| May 21, 1993 | [JP] | Japan | 5-120198 |
| May 27, 1993 | [JP] | Japan | 5-126238 |
| Sep. 3, 1993 | [JP] | Japan | 5-220279 |
| Sep. 8, 1993 | [JP] | Japan | 5-223647 |
| Sep. 9, 1993 | [JP] | Japan | 5-224186 |
| Oct. 19, 1993 | [JP] | Japan | 5-261285 |

[51] Int. Cl.[7] ........................................ H02J 7/00
[52] U.S. Cl. ............................... 320/128; 320/127
[58] Field of Search ........................... 320/128, 127, 320/134, 136

[56] References Cited

U.S. PATENT DOCUMENTS

| 3,543,043 | 11/1970 | Dunn | 307/18 |
|---|---|---|---|
| 5,142,215 | 8/1992 | Mathison | 320/40 |
| 5,519,563 | 5/1996 | Higashijima et al. | 320/40 X |
| 5,530,336 | 6/1996 | Eguchi et al. | 320/5 |
| 5,547,775 | 8/1996 | Eguchi et al. | 320/40 X |
| 5,550,462 | 8/1996 | Nakajima | 323/277 |
| 5,554,919 | 9/1996 | Uchida | 320/14 |
| 5,617,010 | 4/1997 | Higashijima et al. | 320/5 X |
| 5,841,265 | 11/1998 | Sudo et al. | 320/134 |

FOREIGN PATENT DOCUMENTS

| 0458716 | 11/1991 | European Pat. Off. . |
|---|---|---|
| 0512340 | 11/1992 | European Pat. Off. . |
| 0525744 | 2/1993 | European Pat. Off. . |
| 63-132783 | 8/1988 | Japan . |

OTHER PUBLICATIONS

Mead et al., "Intro to VLSI Systems", 1980, p. 51.
Grebene, "Bipolar and MOS Analog Integrated Circuit Design", p. 142. (No Date).
Patent Abstracts of Japan, vol. 17, No. 473 (E–1423) Aug. 27, 1993.
Patent Abstracts of Japan, vol. 17, No. 13 (E–1304) Jan. 11, 1993.
Ruska, "Microelectronics Processing: An Intro to the Manufacture of Integrated Circuits", 1987, pp. 105–108.

Primary Examiner—Adolf Denske Berhane
Assistant Examiner—Lawrence Luk
Attorney, Agent, or Firm—Adams & Wilks

[57] ABSTRACT

A charge/discharge control circuit is provided for an electric power source apparatus in which a service life is prolonged. A voltage dividing circuit, an overcharge voltage detection circuit, an overdischarge voltage detection circuit and a control circuit are connected in parallel to a secondary cell which is an electric power source, wherein the control circuit detects a condition of the secondary cell from the overcharge/overdischarge voltage detection circuits and outputs a signal Vs for controlling a power supply to an external equipment and a charge by an external power source and controls a switching element provided in series with the voltage dividing circuit and reduces a current which flows through the voltage dividing circuit.

4 Claims, 27 Drawing Sheets

CHARGE/DISCHARGE CONTROL CIRCUIT AND CHARGEABLE ELECTRIC POWER SOURCE APPARATUS

The present application is a divisional of prior U.S. application Ser. No. 08/816,196, filed on Mar. 12, 1997, now U.S. Pat. No. 5,841,265, which is hereby incorporated by reference, and priority thereto for common subject matter is hereby claimed.

BACKGROUND OF THE INVENTION

The present invention relates to a charge/discharge control circuit which can control charge/discharge of a secondary cell and it relates to a chargeable electric power source apparatus used for the charge/discharge control circuit.

A conventional electric power source apparatus provided with a secondary cell or battery is shown in a block diagram of FIG. 2. For example, such a type of apparatus is disclosed in Japanese Patent Application Laid-Open No. Hei 4-75430 entitled "Chargeable Type Electric Power Source Apparatus". More specifically, a secondary cell 101 is connected to an external terminal $-V_0$ or $+V_0$ through a switching circuit 103. Further, A charge/discharge control circuit 102 is connected in parallel to the secondary cell 101. The charge/discharge control circuit 102 has a function to detect a voltage of the secondary cell 101. In either overcharged condition (where the voltage is kept higher than a predetermined value) of the voltage of the secondary cell 101 or overdischarged condition (where the voltage is kept lower than a predetermined voltage value), a signal for turning off the switching circuit 103 is fed from the charge/discharge control circuit 102. Accordingly, in the overcharged condition, the switching circuit 103 is turned off, so that a charge is interrupted to the secondary cell 101 from a primary electric power source which is connected to the external terminals $-V_0$ and $+V_0$. In case of the overdischarged condition, the switching circuit 103 is turned off, so that a supply of the energy to a load (for example, a portable telephone using the secondary cell) is interrupted. Namely, the charge/discharge control circuit 102 controls the switching circuit 103 between the secondary cell 101 and the external terminals, thereby preventing a charge larger than necessary from the external terminals to the secondary cell 101 and at the same time preventing an excessive chargeability degradation of the secondary cell caused by an energy supply from the secondary cell 101 to the load connected to the external terminals.

Also, a chargeable electric power source apparatus as shown in a block diagram of FIG. 30 is known as another conventional example. In FIG. 30, a secondary cell 101 is connected to an external terminal $-V_0$ or $+V_0$ through a switching circuit 103 and a current sensing resistor 104. Further, A charge/discharge control circuit 102 is connected in parallel to the secondary cell 101 and an overcurrent detecting circuit 105. The charge/discharge control circuit 102 has a function to detect a voltage of the secondary cell 101. In either overcharged condition of the voltage of the secondary cell 101 or overdischarged condition, a signal for turning off the switching circuit 103 is outputted from the charge/discharge control circuit 102. Also, in the case where an accident occurs in the load to cause the overcurrent condition, a comparator 21 monitors the voltage of the current sensing resistor 104 and compares it with a voltage of a reference voltage circuit 106.

It is assumed that $V_{REF}$ [V] is the voltage value of the reference voltage circuit 106, $R[\Omega]$ is the resistance value of the current sensing resistor 104 (in this case, if the ON-resistance of the switching circuit 103 is assumed much smaller than R), and I [A] is the current flowing in this case, the current flowed is represented as following equation (1).

$$I\ V_{REF}/R\ [A] \tag{1}$$

In this case, the output of the comparator is changed from "H" to "L", a transistor 107 is turned off, a capacitor 109 is charged by a constant current source 108, thereafter in a certain time lag, the output of a comparator 302 is changed from "H" to "L", and the switching circuit 103 is turned off. Namely, the constant current source 108, the capacitor 109 and the transistor 107 constitute a time delay circuit for delaying the output of the comparator 302. The delayed signal is input into the comparator 302 together with the signal of the reference voltage circuit 106. These signals are compared with each other in the comparator 302. The output turns off the switching circuit 103.

Another conventional electric power source apparatus provided with a secondary cell and a charge/discharge control circuit is shown in a block diagram of FIG. 37. For example, such a type of apparatus is disclosed in Japanese Patent Application Laid-Open No. Hei 4-75430 entitled "Chargeable Type Electric Power Source Apparatus". More specifically, a secondary cell 24 and a charge/discharge controlling IC 374 are connected to an external terminals $+V$ and $-V$ through switching transistors 372 and 373, respectively.

For instance, in the case where the voltage of the secondary cell 24 exceeds an overcharged voltage when a charging electric source is connected to the external terminals $+V$ and $-V$, the switching transistor 372 is switched over from the "ON" condition to "OFF" condition to thereby stop the charge from the external terminals to the secondary cell 24. Conversely, in the case where a portable equipment such as a video camera or the like is connected to the external terminals and electric charge is supplied from the secondary cell 24 to the portable equipment, if the voltage of the secondary cell drops below the overdischarged voltage, the switching transistor 373 is switched over from the "ON" condition to "OFF" condition to thereby stop the discharge. One of the transistors 372 and 373 functions as a "transistor" and the other functions as a "diode". The functions as the transistor and the diode are alternatively used in accordance with the charging or discharging condition. A substrate of each transistor is connected to an associated source so as to be capable of functioning as the diode.

The conventional charge/discharge control circuit as shown in FIG. 2, has a drawback of a large power consumption to shorten the service life of the secondary cell of the energy supply source. As a result, the period of time of use of the equipment to be driven by the secondary cell would be shortened. Further, under the overdischarged condition were the chargeability capacity of the secondary cell is degraded, even though the energy supply from the secondary cell to the external equipment by the switching circuit is interrupted, the power consumption of the charge/discharge control circuit per se provided within the power source apparatus causes the charge to be further discharged to accelerate the degradation of the cell and the service life thereof.

In order to overcome the above-noted short-comings inherent in the prior art system, an object of the present invention is to provide a chargeable power source apparatus with a long service life secondary cell by reducing the power consumption of the charge/discharge control circuit.

The conventional charge/discharge control circuit shown in FIG. 30 suffers from the following defects. Namely, under the condition that a charger is connected with the terminals $-V_0$ and $+V_0$ from the outside and the secondary cell 101 is charged, when the secondary cell is fully charged, the switching circuit 103 is turned off. By this "OFF" operation, the potential between both ends of the secondary cell 101 is reduced, and the system is again kept under the charged condition, i.e., the switching circuit 103 is turned on. At the voltage after the completion of the charging operation, the detection of the full charge would be oscillated unstably.

As described in the description of the conventional system, when the overcharged condition appears during the charging operation to the secondary cell, the charge/discharge control circuit operates to turn off the switching circuit for controlling the charge to the secondary cell. However, since the charge/discharge control circuit is connected in parallel with the secondary cell, the current to be consumed during the operation is supplied from the secondary cell. The voltage drop occurs in the secondary cell by its supply of the current, and the voltage would be less than the overcharged detection voltage to thereby turn on the switching circuit. As a result, the operation is as follows: the voltage elevation of the secondary cell by the charging operation; the elevation up to the overcharged voltage; the voltage drop of the secondary cell by the operation of the charge/discharge control circuit; and the voltage elevation of the secondary cell by the charging operation again. The same operational steps are repeated so that the operation could not reach the overcharged condition. Also, in the case where the overdischarged condition is released during the charging operation of the overdischarged cell, the conventional system suffers from the same problem.

Also, when the charge/discharge control circuit is for the first time connected to the secondary cell, unless a logic of the switching circuit is not secured, the initial condition would be unstable, and even if the voltage value of the secondary cell would be normal, the system would be brought into the overcharged condition or the overdischarged condition.

When the overdischarged condition of the secondary cell has developed so that the voltage value is less than a minimum voltage at which the voltage detection circuit within the charge/discharge control circuit or the control circuit is operated, the output of the voltage detection circuit or the control circuit would be unstable. Namely, since the voltage of the secondary cell is further decreased from the overdischarged condition, even if attempts are made to charge the secondary cell from the primary power source, the charge/discharge control circuit could not normally operate the switching circuit, as a result of which the charge is impossible. Namely, once the voltage of the secondary cell has been reduced less than the minimum voltage of the charge/discharge control circuit, since it is impossible to perform the charging operation, it is impossible to reuse the cell although it is a "secondary battery cell".

Another problem inherent in the conventional system will be explained. In the case where the charger is connected to both ends of the secondary cell and the secondary cell is charged, if the charge/discharge control circuit is connected under the condition that polarities of the charger are different from those of the secondary cell (i.e., so-called reverse connection), a CMOS IC which forms the charge/discharge control circuit is latched up so that the charge/discharge control circuit malfunctions to cause a large current to flow through the secondary cell to degrade the cell.

Still another problem in the conventional system will be explained. In the case where an accident occurs in a load which is connected to both ends of the secondary cell, if a large amount of current will flow from the secondary cell, the switching circuit 103 is turned off by the overcurrent detection circuit or the voltage of the secondary cell is rapidly increased by turning off this switching circuit so that the reference voltage value of the charge/discharge control circuit is increased. As a result, the switching circuit 103 is again closed to cause the oscillation.

In order to solve the problems inherent in the conventional system, an object of the present invention is to provide a charge/discharge control circuit which never malfunctions.

Furthermore, in the case where two secondary cells are connected in series, the conventional system suffers from the following defects. Namely, the two secondary cells have respectively different consumption levels due to their service lives. However, if the sum of the voltages of the two cells may be kept over a certain level, there is no problem in use. In the conventional system, since each cell voltage is monitored, it is impossible to monitor the sum of the voltages. In some cases, even if it is possible to use the cells more, the cells are no longer used. Thus, the period of time for use of the equipment would be shortened. Also, if the cell which suffers the local consumption is charged in the same manner as for the other normal cell, the local consumption is further accelerated to considerably reduce the service life of the cell.

Also, the chargeable electric power source apparatus shown in FIG. 37 suffers from the following defect. In this system., the two switching transistors are interposed between the external terminals and the secondary cell, and respective substrates are kept at potentials of the source electrodes of the transistor on the external terminal side and the transistor on the secondary cell side. Therefore, these transistors are assembled separately from the assembly of the charge/discharge control IC. As a result, it is difficult to make the battery compact and the assembly cost is high.

Accordingly, another object of the present invention is to provide a charge/discharge control circuit for a chargeable battery apparatus and a chargeable electric power source apparatus, which is small in size and low in cost with high reliability.

SUMMARY OF THE INVENTION

First Aspect of the Invention

In order to overcome the defects inherent in the prior art systems shown in FIGS. 2, in a charge/discharge control circuit according to the present invention, a switching means for limiting a consumption current is provided in an electric power source voltage detection circuit for monitoring a voltage of a secondary cell. More specifically, the switching means for limiting the consumption current is provided in a voltage dividing circuit which constitutes a part of the electric power source voltage detecting circuit.

Also, according to the present invention, the consumption current is suppressed by a current limiting means for limiting an overall consumption current flowing through an error amplifier. For instance, a power turning-on/off function is applied to the error amplifier of an overcharge detection circuit as the current limiting means, whereby in accordance with the signal of the overdischarge detection circuit, the error amplifier is turned on or off to suppress the consumption current of the battery under the overdischarged condition.

Also, in the charge/discharge control circuit according to the present invention, a switching means for controlling the consumption current is provided to a buffer circuit for externally outputting a potential at a connection point of each cell constituting a secondary cell. The switching means is controlled in accordance with the control circuit provided in the charge/discharge control circuit. In particular, under the restricted condition of the overdischarge in which the capacity of the secondary cell is degraded, the control circuit controls the switching means so that the switching means of the buffer circuit is turned on.

Furthermore, in the charge/discharge control circuit according to the present invention, a single reference voltage source is commonly used for the overcharge voltage detection circuit and the overdischarge voltage detection circuit for monitoring the voltage of the secondary cell.

Moreover, in the case where a secondary cell is composed of a plurality of cells connected in series, an overcharge voltage detection circuit and an overdischarge voltage detection circuit may monitor the voltage of each cell. Different voltages for the voltage detection circuit for monitoring the voltage of each cell are formed by a single reference voltage generating circuit.

In the charge/discharge control circuit according to the present invention, functions of both overcharge detection voltage dividing circuit for obtaining partial voltages for overcharge detection of the secondary cell and overdischarge detection voltage dividing circuit for obtaining partial voltages for overdischarge detection of the secondary cell are formed by a single overdischarge/discharge detection voltage dividing circuit.

Second Aspect of the Invention

In order to overcome the defects inherent in the prior art system shown in FIG. 30, in a charge/discharge control circuit according to the invention, after the voltage detection circuit has detected the overcharge/overdischarge state in the secondary cell, the set voltage is reset to a voltage at which the overcharge/discharge may readily be detected, and at the same time, a timing of a signal is set for turning off the switching circuit after the resetting.

Also, in the charge/discharge control circuit according to the present invention, a delay circuit is interposed between a voltage detection comparator and a control circuit. Also, the delay circuit ensures a logic for a constant period of time upon the connection with the secondary cell to thereby turn on the switching circuit. Thus, the chargeable electric power source apparatus may be used from the initial stage.

Also, a voltage of an external terminal of an electric power source apparatus is fed into the charge/discharge control circuit according to the present invention. Even if the voltage of the secondary cell would exceed a minimum allowable voltage of the charge/discharge control circuit, when the charger is connected to the power source apparatus, the switching circuit may be controlled with a special circuit.

In the charge/discharge control circuit according to the invention, if the secondary cell is connected with its plus and minus polarities being reversed, an output signal for turning off the switching circuit is always fed from the control circuit. More specifically, the output of the voltage detection circuit for determining the output of the control circuit is always such that the switching circuit is turned off. In more detail, the output of the constant voltage circuit relating to the output of the voltage detection circuit is turned off by the switching circuit.

Furthermore, in the charge/discharge control circuit according to the present invention, a latch function is provided to the overcurrent detection circuit. So long as a load is not removed once the overcurrent is detected, the latch is not released.

Third Aspect of the Invention

In order to overcome the defects inherent in the prior art system shown in FIG. 37, in a charge/discharge control circuit according to the invention, respective voltages of two secondary cells are monitored, and in response to the monitored voltage value of one, the voltage detection value of the other is switched over.

According to the invention, in order to monitor the sum of voltage of the two cells, resistors are provided between the terminals to which the sum of voltage is fed to form a voltage detection circuit.

The numbers of transistors connected in series between the external terminal and the secondary cell is one according to the invention. In order to reduce the number of the transistor to one, the substrate of the transistor is interposed between the source electrode and the drain electrode of the transistors for switching.

Furthermore, a charge/discharge control semiconductor integrated circuit device uses a semiconductor substrate (hereinafter referred to as an SOI substrate) (Silicon On Insulator) having a semiconductor film provided on an insulation film which can control the substrate for the transistor as desired.

Action

In the charge/discharge control circuit according to the first aspect of the invention, the consumption current may be reduced by the consumption current limiting switching means provided in the voltage detection circuit.

In the thus structured charge/discharge control circuit, since the consumption current through the overcharge detection circuit is cut in particular under the overdischarge condition, it is possible to suppress the electric power consumption of the battery under the discharge condition and it is possible to prevent the degradation of the battery.

Also, a single multi-input type error amplifier is used as a plurality of error amplifiers. Thus, it is possible to considerably reduce the chip area.

With such a structure, the consumption current of the buffer circuit may be reduced to a minimum possible level to thereby provide a charge/discharge control circuit having a small consumption current and to provide a chargeable electric power source apparatus having a long service life.

In the charge/discharge control circuit with such an arrangement, since the reference voltage source may be formed of half the number of the components or less, it is possible to reduce the consumption current and the number of components (chip size in case of an IC).

In the charge/discharge control circuit with such an arrangement, the voltage dividing circuit for detecting the voltage may be theoretically formed of half the number of the constituents. Accordingly, the current flowing the circuit may be reduced to half the level of the charge/discharge control circuit in which the voltage dividing circuits are separately formed.

Also, the voltage dividing circuit is commonly formed for the overcharge-voltage detecting circuit and for the overdischarge voltage detecting circuit to thereby reduce the number of the components. In the case where the circuit is composed of an IC, since the number of components may be reduced, the chip size may be reduced.

In the charge/discharge control circuit according to the second aspect of the invention, after the detection of the overcharge/overdischarge, the detection voltage for the overcharge/overdischarge is reset to a level at which the overcharge/overdischarge may readily be detected. Furthermore, thereafter, the switching circuit is turned off, so that the malfunction of reverse is given to the voltage detection circuit due to the voltage variation of the secondary cell caused by the turn-off of the switching circuit.

Also, since the control circuit operates a certain time lag after the voltage detection comparator has been operated, a large volume of penetration current would not flow at once and the voltage drop of the secondary cell may be prevented. Also, in the charging operation, since the voltage of the secondary cell is raised also during the delay period, the detection operation is more insured. Furthermore, since the delay circuit insures a logic for a constant period of time upon the initial connection with the secondary cell, the control circuit turns on the switching circuit, and the chargeable electric power source apparatus may be used from the initial connection state.

Also, even if the voltage value of the secondary cell would exceed the minimum allowable voltage of the charge/discharge control circuit, it is possible to control the switching circuit without fail. Even if the voltage of the secondary cell would be extremely lowered, the charging operation is still positively carried out.

Also, in case of the reverse connection, since the switching circuit is always turned off, the charger and the secondary cell are electrically separated. Accordingly, the secondary cell is free from an adverse connected effect of the charger.

Also, by the latch function provided in the overcurrent detection circuit, it is possible to avoid the oscillation during the overcurrent detection.

In the charge/discharge control circuit according to the third aspect of the invention, the resistor is provided between the terminals to which the sum of voltage is fed, thus performing the voltage detection.

Also, in response to the voltage value of one cell, the overcharge detection voltage of the other cell is switched over so that it is possible to carry out the charge/discharge control where the difference in voltage value therebetween is small.

Furthermore, it is possible to set the substrate potential independently of each other. Furthermore, it is possible to reduce a size of the transistor.

PREFERRED EMBODIMENTS OF THE INVENTION

A first embodiment of the invention will now be described with reference to the accompanying drawings.

Figure 1:
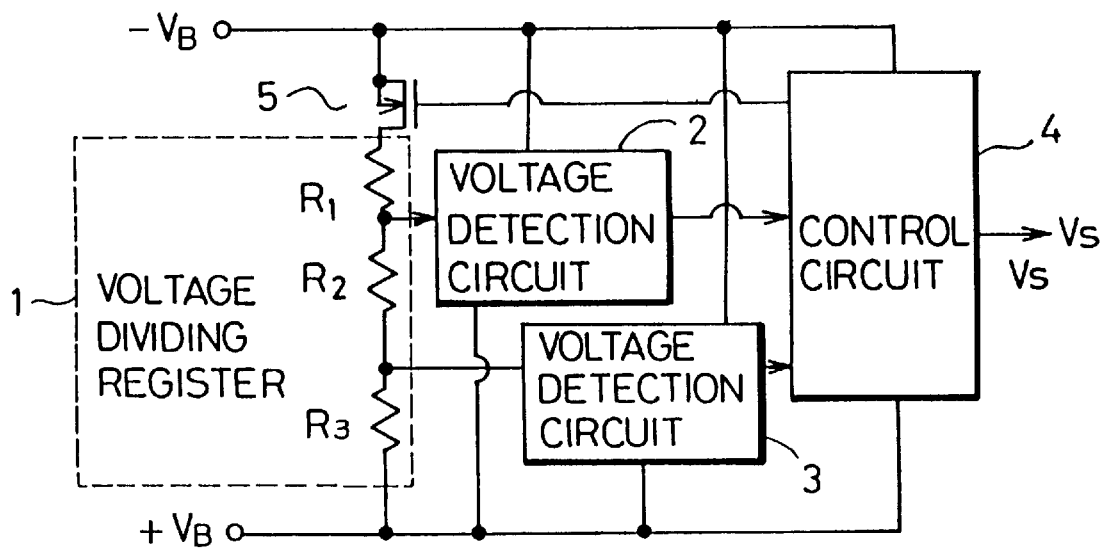
FIG. 1 is a circuit block diagram showing a charge/discharge control circuit according to a first embodiment of the invention.

FIG. 1 is a circuit block diagram showing a charge/ discharge control circuit according to the first embodiment of a first aspect the invention. In the case where the charge/discharge control circuit is applied to an electric power source, it operates a secondary cell as an electric power source. Namely, in this case, the secondary cell is connected to power source terminals $-V_B$ and $+V_B$.

Resistors 1 of an electric power source voltage dividing means for dividing the power source voltage, voltage detection circuits 2 and 3 for detecting the two output voltages of the power source voltage dividing means, respectively, and a control circuit 4 for outputting a final control signal $V_S$ n response to the output signals of the respective voltage detection circuits 2 and 3 are connected in parallel with the power source.

Figure 3:
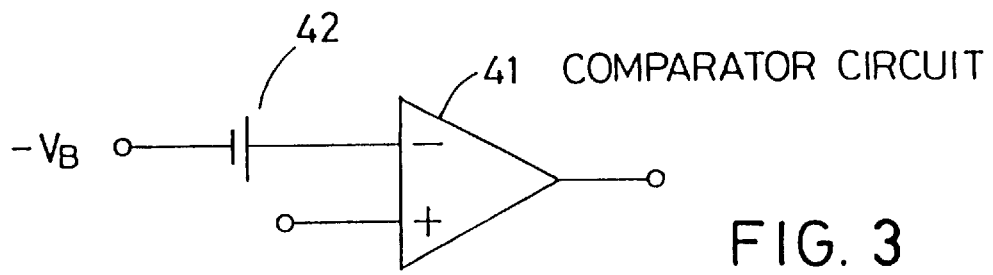
FIG. 3 is a circuit diagram showing a voltage detector.

More specifically, as shown in FIG. 3, each of the voltage detection circuit 2 and 3 is composed of a comparator circuit 41 receiving a reference voltage source 42 relative to the power source terminal $-V_B$ and the output of the voltage dividing resistor. The voltage detection circuit 2 is used for detecting an overcharge, and the voltage detection circuit 3 is used for detecting an overdischarge. An overcharged voltage detecting circuit for detecting the overcharge of the second cell as an electric power source is constituted by the electric power source voltage dividing circuit 1 and the voltage detection circuit 2. Also, an overdischarged voltage detecting circuit for detecting the overdischarge of the second cell as an electric power source is constituted by the electric power source voltage dividing circuit 1 and the voltage detection circuit 3. In the present invention, it is possible to separately provide the electric power source dividing circuits for the inputs of the voltage detection circuits. FIG. 1 shows an example of a charge/discharge control circuit in which the voltage dividing circuit is commonly provided for the respective voltage detection circuits. The control circuit 4 receives the signals relative of the overcharge/overdischarge of the second cell from the respective voltage detection circuits 2 and 3 and outputs the signal $V_S$ for turning on and off a switching circuit of the power source apparatus.

The control circuit 4 also controls a switching element 5 which is provided for controlling a current flowing through the voltage dividing resistors 1. The voltage dividing resistors 1 which constitute the electric source voltage dividing circuit are simply constructed so that the resistors are connected in series. Accordingly, if the voltage dividing resistors 1 are connected directly to the power source lines $-V_B$ and $+V_B$ without any means, a large DC current will flow therethrough. The switch element 5 is interposed between the power source line $-V_B$ and the voltage dividing resistors 1 and is controlled by the signal from the control circuit 4 or a signal produced by other circuits.

The smaller the resistance of the switch element 5 connected in series with the voltage dividing resistors 1 becomes, the more will it be preferable. This is because if the resistance of the switch element 5 would be set at a value much smaller than the resistance value of the voltage dividing resistors 1, the output of the voltage dividing resistors 1 would be adversely affected by the resistance value of the switching element 5. Accordingly, it is preferable to provide the switching element 5 at the end of the voltage dividing resistors 1 directly to the power source line rather than the case the switching element is interposed between the voltage dividing resistors 1 as shown in FIG. 1.

In the case where the switching element is an insulation gate type FET (field effect transistor), as shown in FIG. 1, the voltage between the source and the gate electrode of the transistor is set at the electric power source voltage level to thereby suppress the "ON" resistance of the transistor. In order to reduce the current flowing through the voltage dividing resistors 1, a high resistance multi-crystalline film having a sheet resistance of about 10 kΩ/☐ is used as the voltage dividing resistors 1. The resistance values of the voltage dividing resistors 1 are designed to a high level of about 10 MΩ. The "ON" resistance of the switching element 5 is designed to a low resistance value of about several kΩ at highest, and is about one-thousandth as large as the resistance value of the voltage dividing resistors 1. Namely, the "ON" resistance is suppressed to avoid displacement of the voltage detection circuits. Since the "OFF" resistance of the transistor 5 is much larger than the resistance value of the voltage dividing resistors 1, it is possible to essentially avoid any consumption of the power during the "OFF" mode.

Figure 4:
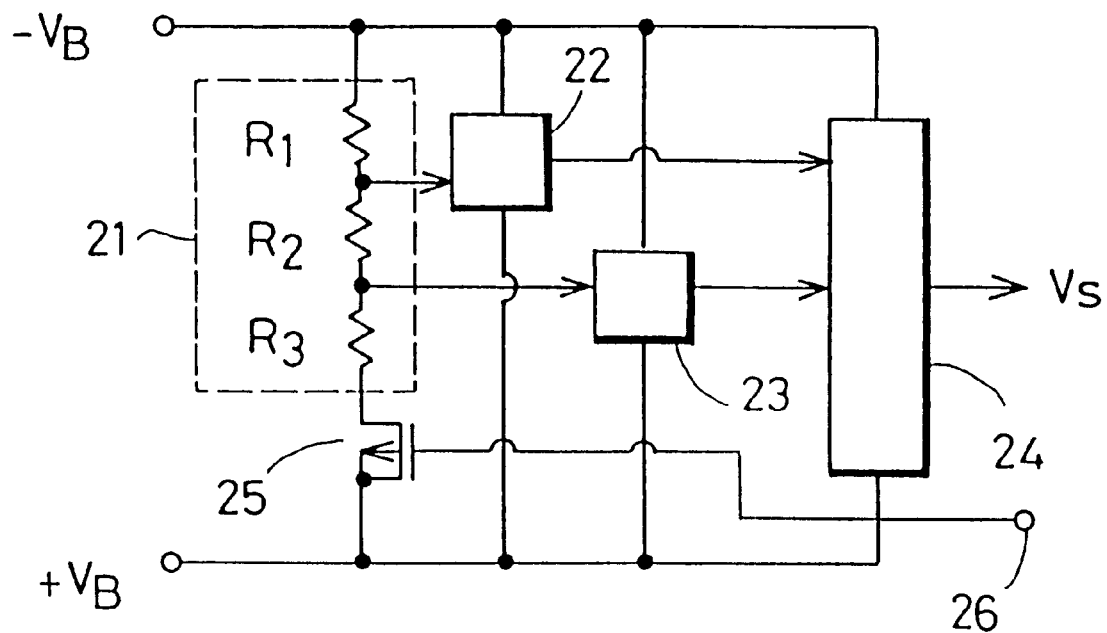
FIG. 4 is a circuit block diagram showing a charge/discharge control circuit according to another embodiment of the invention.

FIG. 4 is a circuit block diagram showing a charge/ discharge control circuit according to the present invention, in which a P-type insulation gate type PET is interposed in series between the voltage dividing resistors 21 and the electric power source terminal $+V_B$. The overcharge voltage detection circuit 22, the overdischarge voltage detection circuit 23 and the control circuit 24 are designed in the same way as in the first embodiment shown in FIG. 1. However, since the switching element 25 is the P-type insulation type gate type transistor, in the case where the switching element 25 is turned off, $+V_B$ is fed into the terminal 26. In the case where the "ON" state is desired, $-V_B$ is fed into the terminal 26. The "ON" resistance insufficiently low because $-V_B$ is applied to the gate voltage of the transistor 25.

Figure 5:
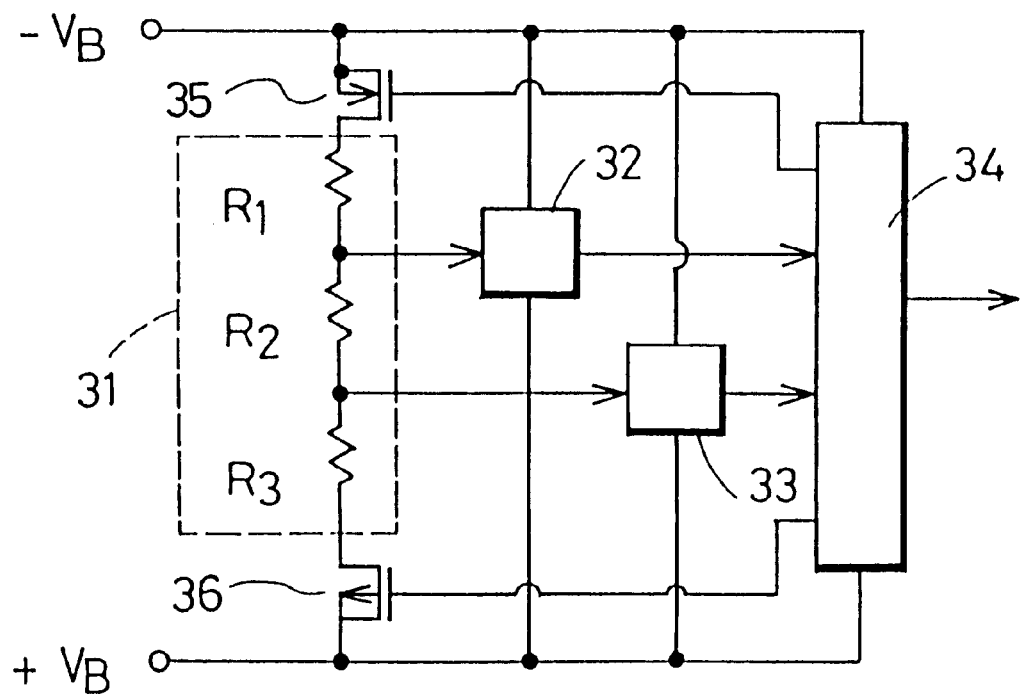
FIG. 5 is a circuit block diagram showing a charge/discharge control circuit according to further another embodiment of the invention.

FIG. 5 is a circuit block diagram showing a charge/discharge control circuit according to the present invention, in which switching elements are inserted on both sides of the voltage dividing resistors. An N-type insulation gate type FET 35 and a P-type transistor 36 are formed on both sides of the voltage dividing resistors 31. The overcharged voltage detection circuit 32, the overdischarge voltage detection circuit 33 and the control circuit 34 are designed in the same way as in the embodiments shown in FIGS. 1 and 4. As shown in FIG. 5, the switching elements 35 and 36 are inserted on both sides of the electric power source, so that it is possible to rapidly operate the electric power source voltage dividing circuit. Also, since the switching elements are inserted substantially equivalently, the "ON" resistances of the switching elements may hardly affect the output of the voltage dividing circuit.

The charge/discharge control circuit according to the present invention may be well applied to an IC provided on the same semiconductor substrate in which the divided voltage of the voltage dividing resistors 1 may be kept almost unchanged.

A second embodiment of the invention will now be described with reference to the drawings.

Figure 6:
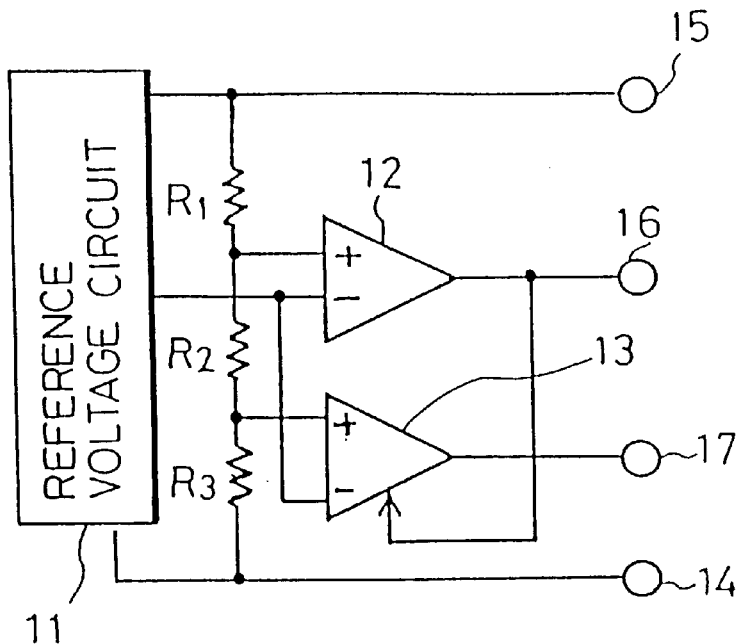
FIG. 6 is a battery charge/discharge control circuit according to a second embodiment of the invention.

In FIG. 6, when the voltage of the battery is not larger than the overdischarge detection voltage $V_{XAH}$ of the following equation (2) where $V_{ref}$ is the voltage value of the reference voltage circuit 11, this condition shows that the battery is under the overdischarged condition. When the battery voltage is not smaller than the overcharge detection voltage $V_{XAJ}$ of the following equation (3), the voltage of the terminal 17 is at a "High" level, which shows the battery is in an overcharged condition.

$$V_{XAH}=(R_1+R_2+R_3) V_{ref}/(R_2+R_3) \quad (2)$$

$$V_{XAJ}=(R_1+R_2+R_3) V_{ref}/(R_3) \quad (3)$$

Namely, by selecting the values of $R_1$ to $R_3$ and the value of $V_{ref}$ in conformity with the characteristics of the battery, it is possible to select $V_{XAH}$ and $V_{XAJ}$ to be any values. An error amplifier 13 of the overdischarge detection circuit has a power ON/OFF function. When the output of an error amplifier 12 is "Low", the power is turned off, whereas when the output of the error amplifier 12 is "High", the power is turned on. When the power is turned off, the error amplifier 13 is not operated to save the consumed current, and the output terminal 17 is fixed to a "Low" level. Namely, the operation of the error amplifier 13 is controlled by the output of the error amplifier 12.

The overdischarge detection voltage $V_{XAH}$ and the overcharge detection voltage $V_{XAJ}$ have the following relationship from the equations (2) and (3):

$$V_{XAH}<V_{XAJ} \quad (4)$$

Figure 7:
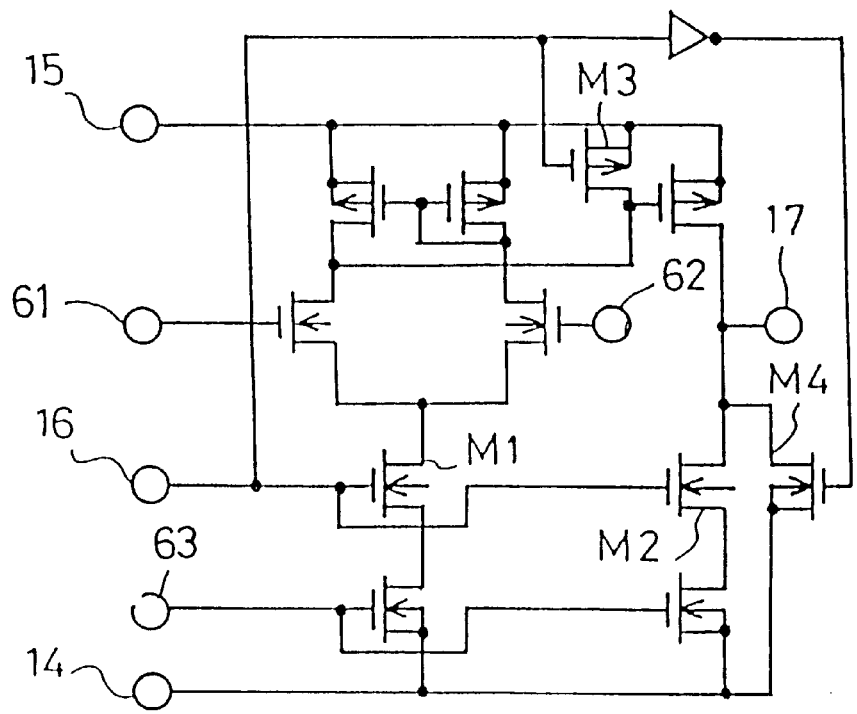
FIG. 7 is a diagram showing an error amplifier having a power turning-on/off function.

Namely, under the condition that the overdischarge is detected, it is not always said that the condition is the overdischarged condition, and hence, it is unnecessary to operate the error amplifier 13 of the overcharge detection circuit. Thus, the present invention may be applied thereto. FIG. 7 shows an example of a circuit for the error amplifier having the power ON/OFF function. The divided voltage and the reference voltage are input into the input terminals 61 and 62, respectively. The error amplifying operation is executed during a period when the "High" level voltage is input to an operation control terminal 63. As a result of the overdischarged condition, the voltage of the terminal 16 is kept at a "Low" level, the transistors $M_1$ and $M_2$ are turned off to thereby cut the consumed current, and the transistors $M_3$ and $M_4$ are turned on to fix the output terminal 17 at a "Low" level.

Another embodiment of the invention will now be described with reference to FIG. 8. Relative to the battery connector terminals 14 and 15, the system is composed of the reference voltage generator 11, a first error amplifier (including M11, M12, M13 and M14), a second error amplifier (including M16, M17, M18 and M19) and a transistor M15. The output of the reference voltage generator 11 is fed into the first and second error amplifiers at the respective transistors M14 and M18. Although it is not shown in FIG. 8, the divided voltage of the battery obtained by the voltage dividing means is fed into the transistors M13 and M19 as inputs b and d in the same way. The signal representative of the discharged condition of the battery is output from the outputs a and c of the error amplifier.

Figure 8:
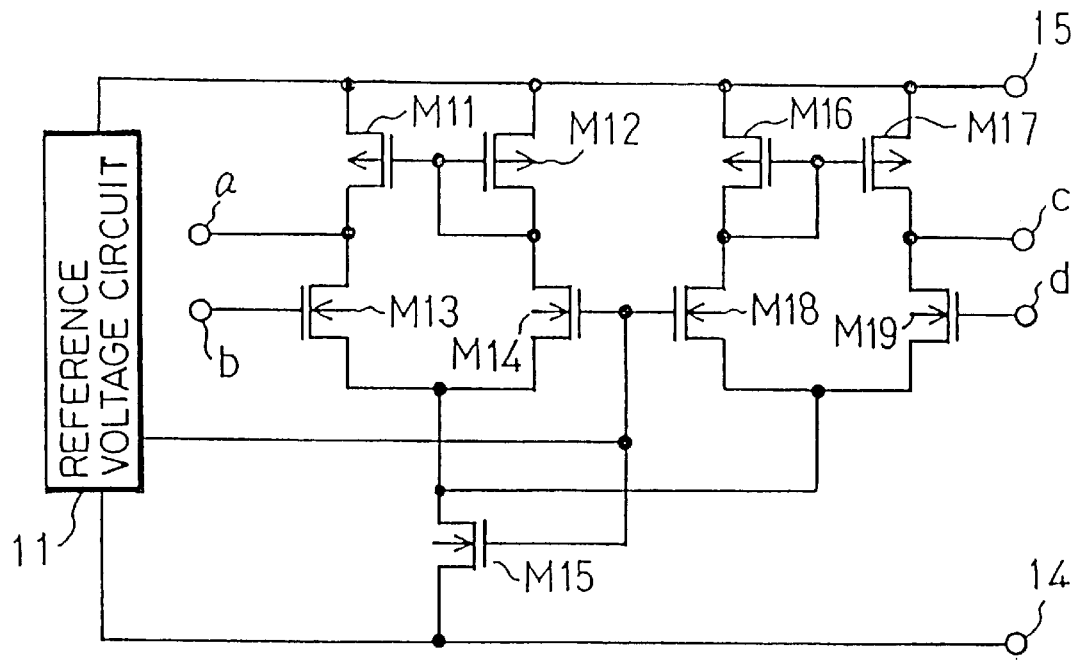
FIG. 8 is a diagram showing a battery charge/discharge control circuit according to another embodiment of the invention.

In FIG. 8, in order to limit the consumption current of both the first and second error amplifiers, the current limiting transistor M15 is connected in series with the respective amplifiers as the current limiting means. With the current limiting transistor M15, it is possible to reduce the sum of the consumption current of the first and second error amplifiers to essentially the same extent as the consumption current of a single error amplifier.

An embodiment will be explained with reference to FIG. 9, in which a plurality of error amplifiers may be integrated into a single multi-input type error amplifier. FIG. 10 is a circuit diagram showing a battery charging controller in which two batteries are connected in series with each other. The circuit shown in FIG. 6 is arranged for each battery 18 or 19. Since the pair of transistors M12 and M14 forming the error amplifier are the same as the pair of transistors M16 and M18 forming the next error amplifier, if one of the two pairs is omitted, it is possible to obtain the circuit shown in FIG. 9 which is a view showing a circuit for the error amplifier and a circuit for a reference voltage circuit of two-input type as an error amplifying means.

Figure 9:
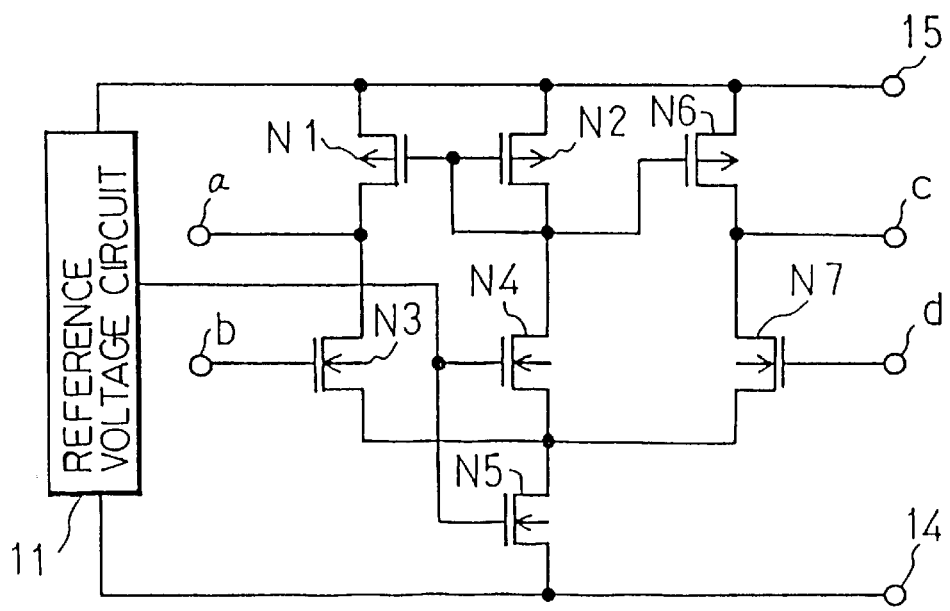
FIG. 9 is a diagram showing a battery charge/discharge control circuit according to further another embodiment of the invention.
Figure 10:
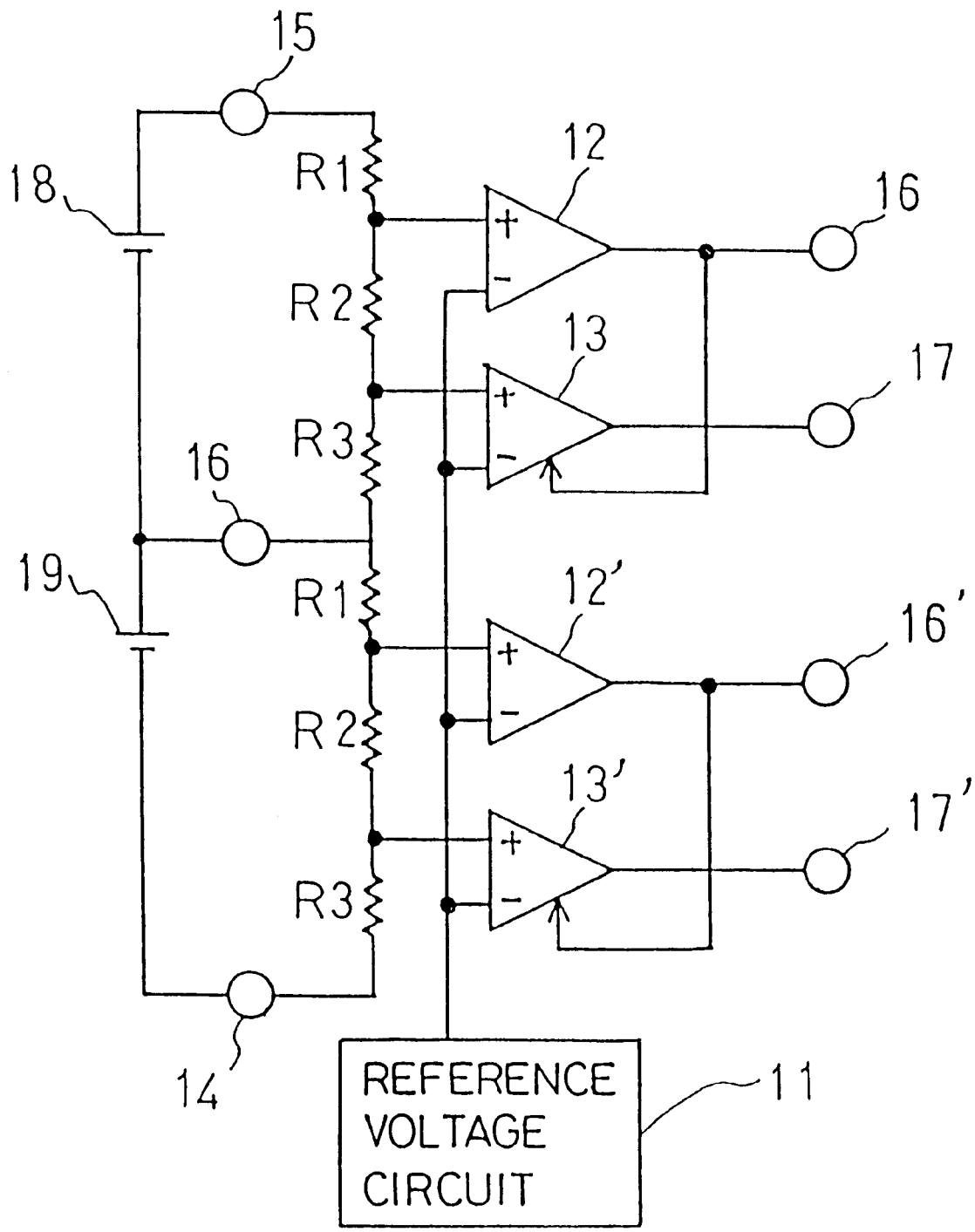
FIG. 10 is a diagram showing a battery charge/discharge control circuit (voltage detector) according to further more another embodiment of the invention.

In FIG. 9, with respect to N1, N2, N3, N4 and N5, there is shown an error amplifier in which N5 is the constant current source, N1 and N2 are active loads, and N3 and N4 are the source coupled pair. It is possible to obtain an output a by comparing (or amplifying) between the N3 gate input voltage b and the N4 gate input voltage (reference voltage).

It is safe to say that since the gate-source voltages of the N1 and N2 are the same, the current flowing through the N1 and N2, i.e., the current flowing through the N3 and N4 is always kept the same. Accordingly, if the gate input voltage b of N3 is higher than the gate input voltage (i.e., reference voltage ) of N4, N3 is more likely to be turned on than N4 to thereby reduce a resistance component and the output a is decreased toward the "Low". On the other hand, if the gate input voltage b of N3 is lower than the gate input voltage (i.e., reference voltage ) of N4, N3 is more likely to be turned off than N4 to thereby increase a resistance component and the output a is decreased toward the "High".

In the same way, with respect to N2, N6, N4, N7 and N5, there is shown a conventional error amplifier in which N5 is the constant current source, N2 and N6 are active loads, and N4 and N7 are the source coupled pair. It is possible to obtain an output c by comparing (or amplifying) between the N7 gate input voltage d and the N4 gate input voltage (reference voltage).

It is safe to say that since the gate-source voltages of the N2 and N6 are the same, the current flowing through the N2 and N6, i.e., the current flowing through the N4 and N7 is always kept the same. Accordingly, if the gate input voltage d of N4 is higher than the gate input voltage (i.e., reference voltage) of N4, N7 is more likely to be turned on than N4 to thereby reduce a resistance component and the output c is decreased toward "Low". On the other hand, if the gate input voltage d of N7 is lower than the gate input voltage (i.e., reference voltage) of N4, N7 is more likely to be turned off than N4 to thereby increase a resistance component and the output c is increased toward "High".

Accordingly, in the case where the different voltages are compared (amplified) relative to the same reference voltage, by inputting the reference voltage to the gate of N4 and the other voltages to the gates of N3 and N7, it is possible to obtain the output a and c, respectively, through the comparison (amplifying) of the reference voltage.

Also, since the transistor N5, which is used as a current limiting transistor for determining the consumption current of the error amplifier, is commonly utilized for the two-input system, it is possible to drive the error amplifying means, which has functions of the two error amplifiers, with the consumption current of the single amplifier.

In the foregoing description, the present invention is applied to an N-ch transistor input type error amplifier, but it is apparent that the present invention may be applied equally to a P-ch transistor input type error amplifier.

A third embodiment of the invention will now be described with reference to the drawings.

Figure 11:
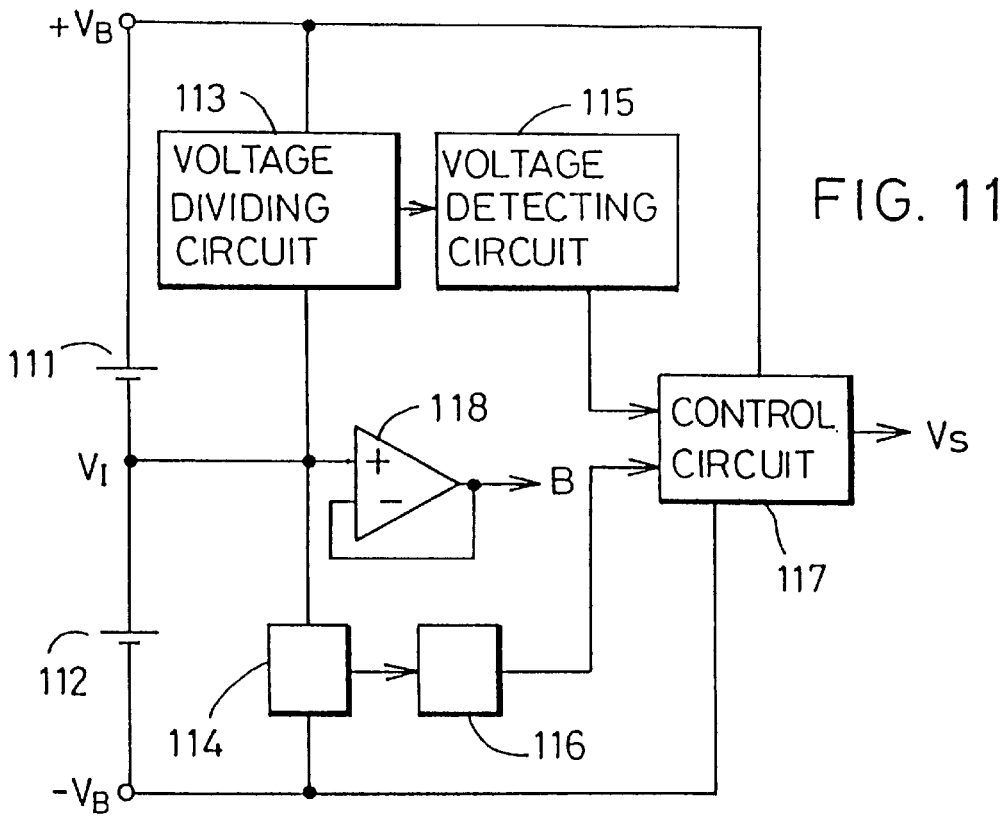
FIG. 11 is a circuit block diagram showing a charge/discharge control circuit according to a third embodiment of the invention.

FIG. 11 is a circuit block diagram showing a charge/discharge control circuit according to the present invention.

As a secondary cell, two cells 111 and 112 are interposed in series between the power source terminals $+V_B$ and $-V_B$ in the charge/discharge control circuit. The voltage of the cell 111 is divided by the voltage dividing circuit 113. The divided voltage is detected by an overcharge/overdischarge voltage detection circuit 115. The output of the voltage detection circuit 115 is inputted into the control circuit 117. When the respective cells are under the overcharged or overdischarged condition, the control circuit 117 outputs a signal $V_S$ for interrupting the connection between the secondary cells and the external terminals of the electric power source. Accordingly, the control circuit 117 is composed of only logic circuits. Also for the cell 112, in the same way, the overcharged condition and the overdischarged condition are detected by the voltage dividing circuit 114 and the voltage detection circuit 116. The detection result is inputted into the control circuit 117 in the form of digital signals in the same way. Accordingly, if any one of the cells 111 and 112 is under the overcharged or overdischarged condition, the electrical connection between the cells and the external electric power source is interrupted to stop the development of the overcharge and overdischarge. Since the charging characteristics and the discharging characteristics of the two cells are not always the same, it is necessary to detect and control separately the overcharge and the overdischarge.

Figure 12:
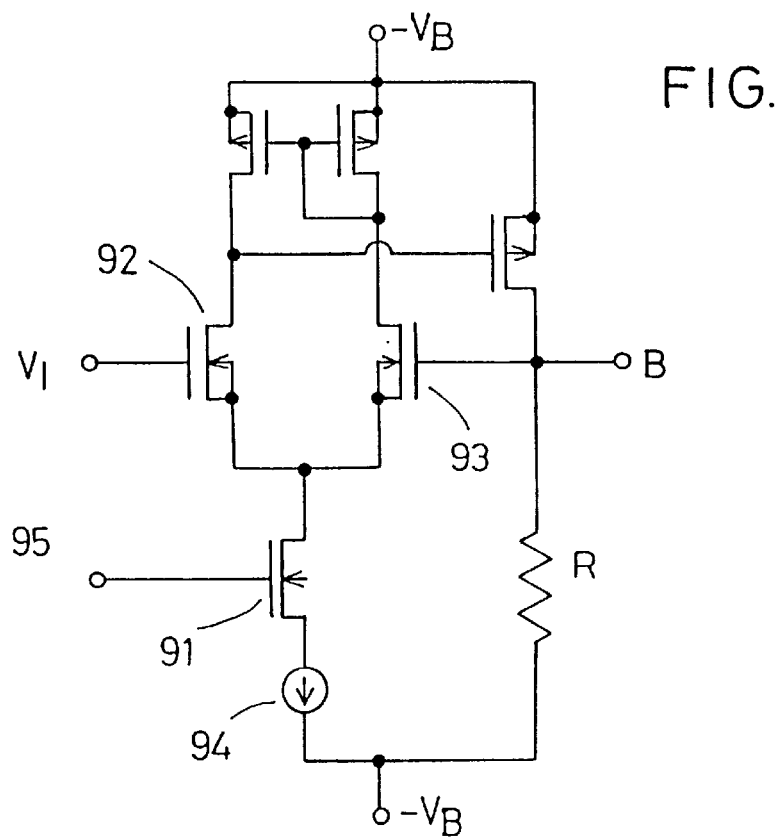
FIG. 12 is a circuit diagram showing a buffer circuit.

A buffer 118 is a circuit for outputting a voltage $V_1$ as a signal B to the outside during the connection between the respective cells. The balance condition of the charge/discharge between the cells may be detected by the signal B. The buffer circuit 118 is provided for preventing the consumption of current from the potential $V_1$ at the connected point to the outside. FIG. 12 shows a detail of the buffer circuit. A power from the power source is supplied from both sides of the secondary cell $+V_B$ and $-V_B$ to the buffer circuit. The connection point potential $V_1$ is inputted into transistors 92 and 93 of an arithmetic amplifier which is one of constituents of the buffer circuit. The connection point potential $V_1$ is substantially at a midpoint of potential of the overall secondary cell power source. Accordingly, a large current flows through the transistors 92 and 93. Therefore, a switching transistor 91 for interrupting the current flow is connected in series with the transistors 92 and 93. The current interrupting transistor 91 is controlled through a gate electrode 95 from the control circuit so as to be turned off to the overdischarged condition. A constant current circuit 94 is inserted for a stable operation of the buffer circuit.

As described above, when the cells are held under the overdischarged conditions, the operation of the buffer circuit into which a midpoint potential is inputted is stopped, so that the consumption current of the charge/discharge control circuit may be reduced.

By the insertion of the current interrupting transistor 91, it is possible to output an independent signal from the terminal B when the buffer circuit is not operated. For example, it is possible to output a signal for warning of the overcharged condition, the normal condition or the overdischarged condition from the terminal B. In the normal state, the connection potential of the two cells is outputted. Under the overcharged condition or he overdischarged condition, by pull-up or pull-down connecting the terminal B, it is possible to output the condition by the digital signal level of $+V_B$ and $-V_B$. Namely, not only does the current interrupting transistor inserted into the buffer circuit interrupts the current of the buffer circuit but it may also output different kinds of signals from the terminal B.

A fourth embodiment of he invention will now be described with reference to the accompanying drawings.

Figure 13:
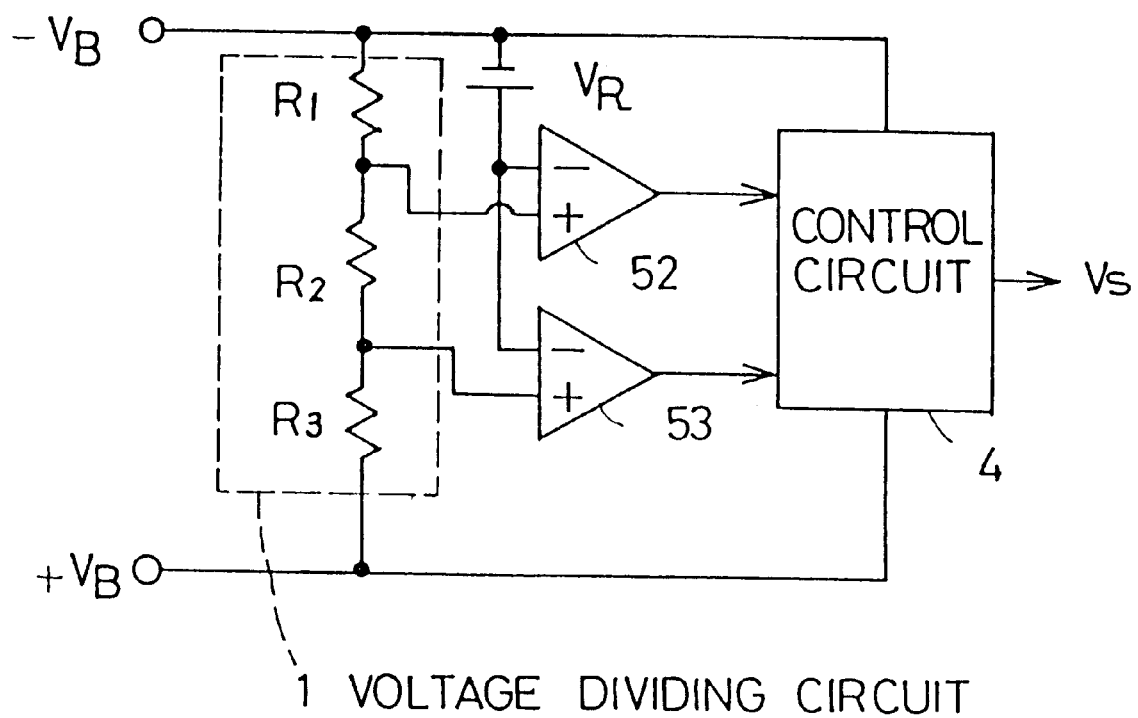
FIG. 13 is a circuit block diagram showing a charge/discharge control circuit according to a fourth embodiment of the invention.

FIG. 13 is a circuit block diagram showing a charge/discharge control circuit according to the invention. The secondary cell to be charged is connected to terminals $-V_B$ and $+V_B$ of the electric power source. The terminal of the electric power source is connected in parallel with each of voltage dividing resistors 1 which form a voltage dividing circuit for dividing the voltage of the secondary cell, comparators 52 and 53 which form voltage detecting circuit for detecting the divided voltages of the voltage dividing resistors 1 and a control circuit 4 for receiving the output signals of the comparators 52 and 53 and outputting a final control signal $V_S$.

The voltage detection circuit is composed of two voltage detection circuits of an overcharge voltage detection circuit and an overdischarge voltage detection circuit. The overcharge voltage detection circuit is composed of a reference voltage source $V_R$ and a comparator circuit 52 whose input is a divided voltage between resistors $R_1$ and $R_2$. The overdischarge voltage detection circuit is composed of a reference voltage source $V_R$ and a comparator circuit 53 whose input is a divided voltage between resistors $R_2$ and $R_3$. The resistance values of the resistors $R_1$, $R_2$ and $R_3$ of the voltage dividing resistors 1 are designed in relation with the reference voltage source $V_R$ so that the output of the comparator 52 is reversed under the overdischarged condition, and the output of the comparator 53 is reversed under the overdischarged condition. When the voltage of the secondary cell falls within a region of the overcharge and a region of the overdischarge, the outputs of the comparators are reversed to be inputted into the control circuit 4. The control circuit 4 receives the signals from the comparators 52 and 53 and outputs to the switching circuit a signal for turning off the switching circuit of the power source apparatus so as to avoid any development of the overdischarged or overcharged condition. As shown in FIG. 13, the reference voltage $V_R$ is used for both the overcharge and overdischarge comparator circuits.

Figure 14:
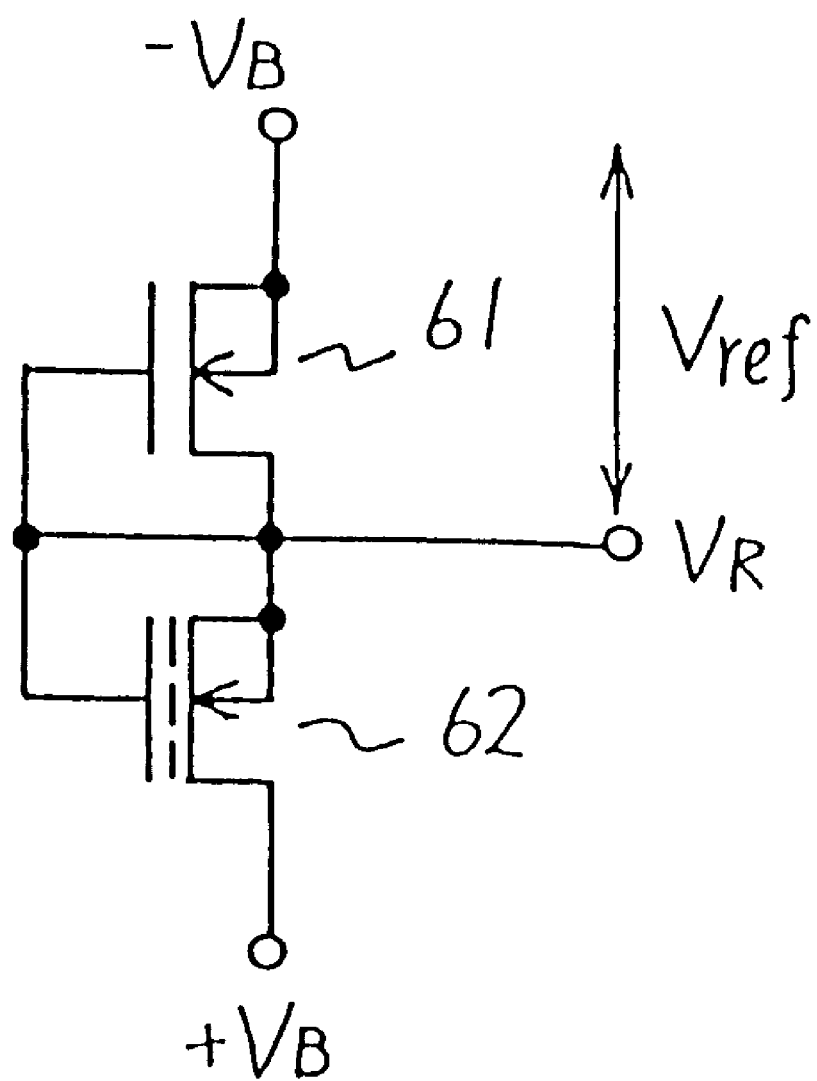
FIG. 14 is a circuit diagram showing a reference voltage circuit.

FIG. 14 shows a circuit diagram showing a reference voltage source. For instance, an enhancement mode N type insulation gate type FET 61 and a depletion mode N type insulation gate type FET 62 are connected in series by using as a power source the secondary cell whose voltage is varied. The respective gate electrodes are the associated connection terminals. A constant voltage $V_{ref}$ independent of a secondary cell voltage variation corresponding to a threshold potential difference of the respective transistors is output with reference to $-V_B$ from the connection terminal. The reference voltage source consumes the energy of the secondary cell although it is not limited to an example shown in FIG. 14. Accordingly, as shown in FIG. 13, the reference voltage source is used commonly for both the voltage detection circuits so that it is possible to reduce the consumption current as well as the number of the components in comparison with the circuit in which the reference voltage sources are separately provided for the respective detection circuits. The consumption current of the charge/discharge control circuit is one of the important factors for determining a service life of the secondary cell. In particular, in the case where the voltage of the secondary cell is reduced under the overdischarged condition, the voltage of the secondary cell is dropped rapidly together with the increase of the consumption energy to reduce the service life. Accordingly, it is an important factor to operate the charge/discharge control circuit with a possible minimum current to provide a chargeable type electric power source apparatus having a long service life.

Figure 15:
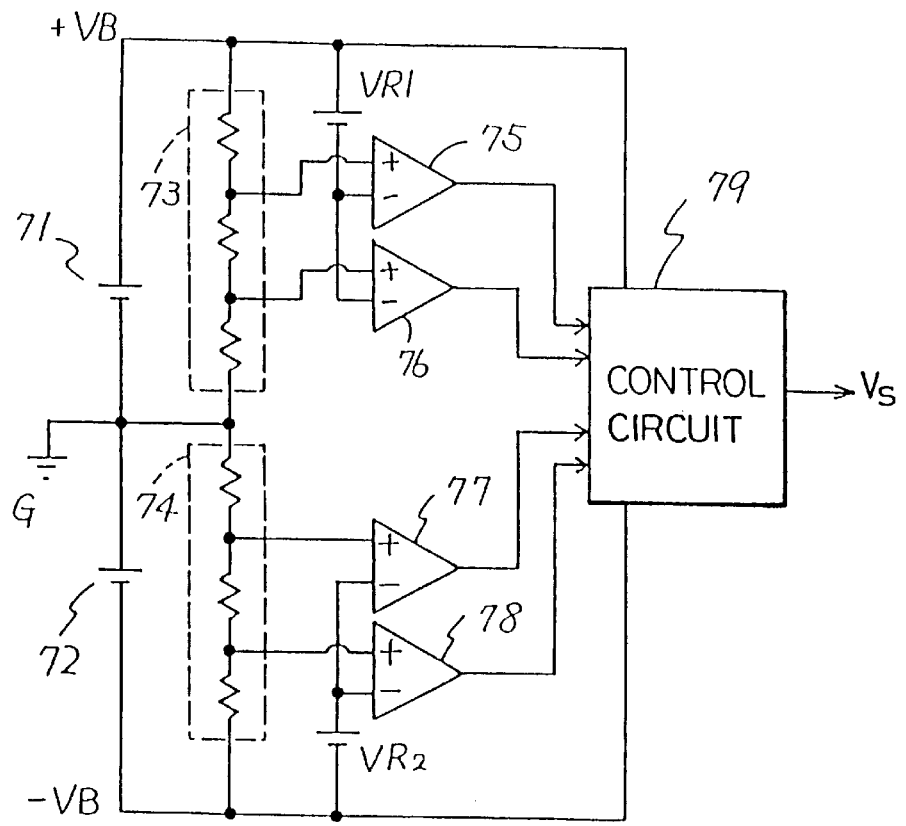
FIG. 15 is a circuit block diagram showing a charge/discharge control circuit in the case where two secondary cells are used.

FIG. 15 is a circuit diagram showing a overcharge/ discharge control circuit in the case where two secondary cells 71 and 72 are connected in series with each other. As shown in FIG. 15, in the case where a secondary battery is composed of a plurality of cells, it is necessary to detect independently the voltages of the respective cells and to form a charge/discharge control circuit. In general, the voltage of the cell is determined by the material of the cell. Accordingly, in many cases where the equipment to be driven by the battery source needs a high voltage, the cells are connected in series as shown in FIG. 15, thereby obtaining the high voltage. As shown in FIG. 15, the charge/discharge control circuit shown in FIG. 13 is connected to the cells 71 and 72. The control circuit 79 which is commonly used for both the cells receives signals from the comparators 75, 76, 77 and 78 and outputs a signal $V_S$ for the switching circuit.

In the circuit shown in FIG. 15, the respective cells 71 and 72 have the positive voltage side $+V_B$ and the negative voltage side $-V_B$ relative to the ground voltage level G. Therefore, as shown in FIG. 15, in the case where the two cells 71 and 72 are connected in series with each other, it is preferable to detect the voltage of the cells by voltages from $+V_B$ and $-V_B$. A reference voltage source $V_{R1}$ on the basis of $+V_B$ is inputted into the comparators 75 and 76 which form a voltage detection circuit for the cell 71. On the other hand, a reference voltage source $V_{R2}$ on the basis of $-V_B$ is inputted into the comparators 77 and 78 which form a voltage detection circuit for the cell 72. The reference voltages sources $V_{R1}$ and $V_{R2}$ are different from each other in reference $+V_B$ and $-V_B$. In general, for the purpose of the charge/discharge control of the cells, the voltages for the overcharge and the overdischarge are kept the same. Accordingly, although there is a difference in reference, the reference voltage source from which the same value is obtained for the respective references is needed.

Figure 16:
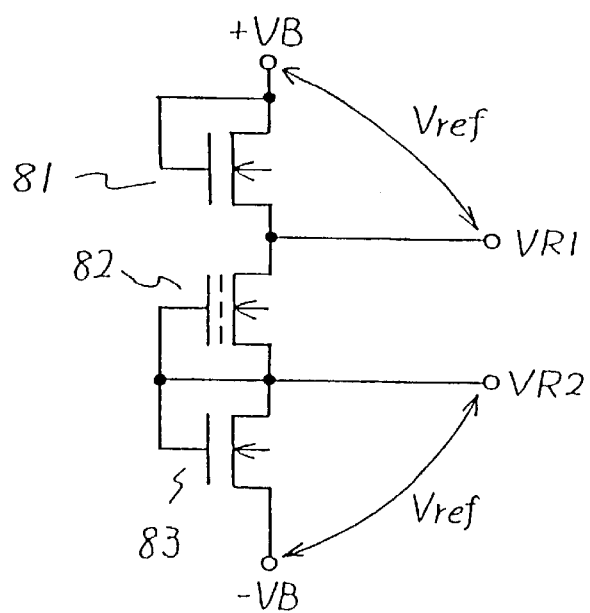
FIG. 16 is a circuit diagram showing a reference voltage circuit for outputting two reference voltages.

FIG. 16 shows an example of a reference voltage circuit for outputting a constant voltage from $+V_B$ and $-V_B$. This example is formed by connecting one more enhancement mode insulation gate FET in series with the reference voltage circuit 14. Namely, the connection lines for the transistors 82 and 83 are the same as those for the reference voltage circuit shown in FIG. 14, and further, a transistor 81 is additionally connected. In this circuit, $V_{R1}$ and $V_{R2}$ are output from the connection points for the respective transistors. $V_{R1}$ outputs a constant voltage $V_{ref}$ relative to $+V_B$. Also, $V_{R2}$ outputs a constant voltage $V_{ref}$ relative to $-V_B$. Accordingly, it is possible to output a constant voltage with the reference voltage circuit shown in FIG. 16 without any additional consumption current. If $V_{R1}$ and $V_{R2}$ shown in FIG. 15 are formed by a single reference circuit as shown in FIG. 16 (only one current path between $+V_B$ and $-V_B$), even in the case where the secondary battery is composed of a plurality of cells, it is possible to form the charge/discharge control circuit without increasing the consumption current.

As described above, according to the present invention, the reference voltage source which had been composed of a plurality reference voltage sources corresponding to the number of the comparator circuits for voltage detection may be composed commonly of a single circuit. The charge/ discharge control circuit according to the present invention needs a plurality of comparator circuits due to its inherent arrangement, and it is one of the most important factors to reduce the consumption current in order to prolong the service life of the secondary battery. Therefore, the present invention has been made based upon a simplified charge/ discharge control circuit, and this is practically advantageous.

If a transistor for cutting the current is interposed in series with the common constant voltage circuit used in the present invention and the current is interrupted by controlling the transistor in accordance with the control circuit, it is possible to further reduce the consumption of the current. In this case, also, since the single constant current circuit is provided, it is possible to obtain the advantage without making the circuit complicated.

Figure 17:
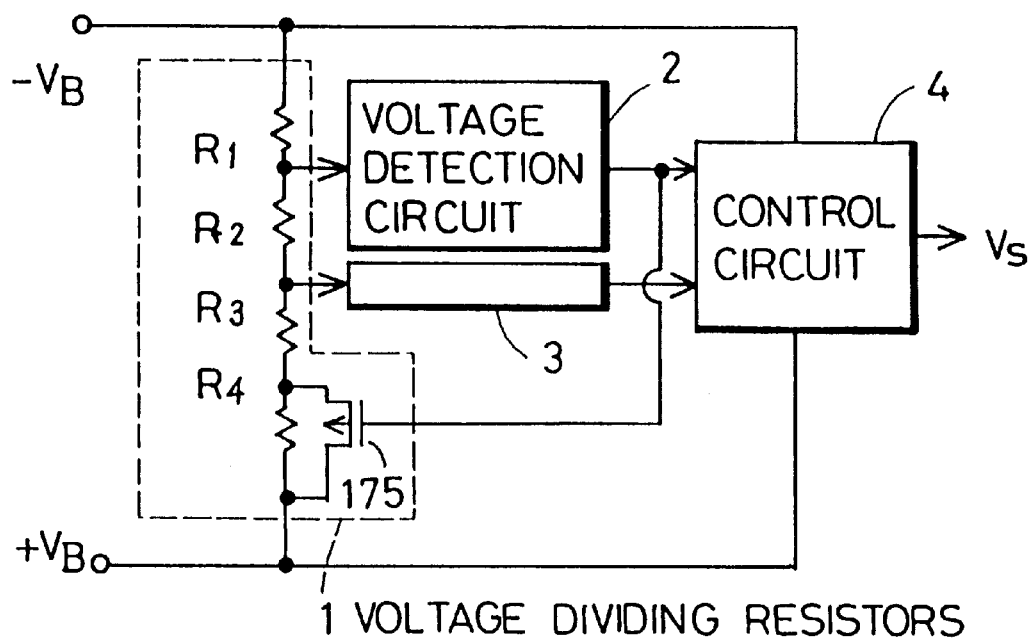
FIG. 17 is a circuit block diagram showing a charge/discharge control circuit according to a first embodiment of a second aspect of the invention.

FIG. 17 is a circuit block diagram showing a charge/ discharge control circuit in accordance with a first embodiment of a second aspect of the invention. If the charge/ discharge control circuit is applied to an electric power source apparatus, it will operate using the secondary cell thereof as a power source. Namely, the secondary cell is connected to $-V_B$ and $+V_B$ to supply an electric power.

Resistors 1 of an electric power source voltage dividing means for dividing the power source voltage, voltage detection circuits 2 and 3 for detecting the two output voltages of the power source voltage dividing means, respectively, and a control circuit 4 for outputting a final control signal $V_S$ in response to the output signals of the respective voltage detection circuits 2 and 3 are connected in parallel with the power source.

As described in conjunction with FIG. 3, each of the voltage detection circuit 2 and 3 is composed of a comparator circuit 41 receiving a reference voltage source 42 relative to the power source terminal $-V_B$ and the output of the voltage dividing resistor. The voltage detection circuit 2 is used for detecting an overcharge, and the voltage detection circuit 3 is used for detecting an overdischarge. An overcharged voltage detecting circuit for detecting the overcharge of the secondary cell as an electric power source is constituted by the electric power source voltage dividing circuit 1 and the voltage detection circuit 2. Also, an overdischarged voltage detecting circuit for detecting the overdischarge of the secondary cell as an electric power source is constituted by the electric power source voltage dividing circuit 1 and the voltage detection circuit 3. In the present invention, it is possible to separately provide the electric power source dividing circuits for the inputs of the voltage detection circuits. FIG. 17 shows an example of a charge/discharge control circuit in which the voltage dividing circuit is commonly provided for the respective voltage detection circuits. The control circuit 4 receives the signals relative of the overcharge/overdischarge of the secondary cell from the respective voltage detection circuits 2 and 3 and outputs the signal $V_S$ for turning on and off a switching circuit of the power source apparatus.

For example, the case where the charging power source is connected through the switching circuit to the secondary cell connected between the terminals $-V_B$ and $+V_B$. Under the charged condition, the voltages $-V_B$ and $+V_B$ at both ends of the secondary cell is gradually increased. When the secondary cell is turned under the overcharged condition, the output signal of the overcharge voltage detection circuit 2 is reversed. The voltage representative of this overcharged condition is varied depending upon a kind of the secondary cell. For instance, in case of lithium ion battery, the voltage is set at 4.3 V. Namely, the output of the charge/discharge control circuit 2 is designed so that is reversed when the secondary cell has been charged with the voltage of he secondary cell being 4.3 V from the dividing circuit part of he voltage dividing circuit 1. The reverse signal outputted from the voltage detection circuit 2 is fed back to the voltage dividing circuit 1. Namely, the signal of the voltage detection circuit 2 is inputted to the gate electrode of a dividing voltage control transistor 5 for controlling a partial voltage of the voltage dividing circuit 1. In accordance with the reversed output signal of the voltage detection circuit 2, immediately, the transistor is turned on so that the dividing voltage is further increased and stabilized so that the voltage detection circuit 2 may output the reverse signal. The transistor 175 is turned on, so that, even if the voltage of the secondary cell is varied to be reduced to, for example, 4.0 V, the voltage of the resistor $R_1$ is kept at a level at which the voltage detection circuit 2 may be sufficiently reversed.

As mentioned above, with the charge/discharge control circuit composed of the voltage dividing circuit 1 and the overdischarge voltage detection circuit, after the detection of the overcharge, the overcharge detection signal is again set at a lower value with its detection signal to thereby perform a more stable overcharge detection. After the lower value has been set again, the signal $V_S$ for turning off the switching circuit is outputted from the control circuit 4. By turning off the switching circuit, the voltage of the secondary cell is reduced by the voltage corresponding to the product of the charging current and the internal resistance of the cell and becomes the voltage generated by a chemical potential inherent in the lithium ion cell. Namely, the voltage is reduced by the value corresponding to the voltage drop by the internal resistance. However, the overcharge detection voltage has been again set at a reduced value from 4.3 V to 4.0 V, and the output of the voltage detection circuit is kept detecting the overcharge. Accordingly, the reduced voltage of 0.3 V (4.3 V–4.0 V) of the overcharge resetting has to be determined at a value which is larger than the voltage drop due to the internal resistance of the secondary cell during the charging operation. In general, the difference of voltage between the initial set volume and the reset voltage falls in the range between 0.2 V to 0.5 V. If it is set over 0.5 V, the overcharge range would be too broad. As a result, the range of use in the normal condition becomes narrow, Namely, the service life would be shortened.

Figure 18:
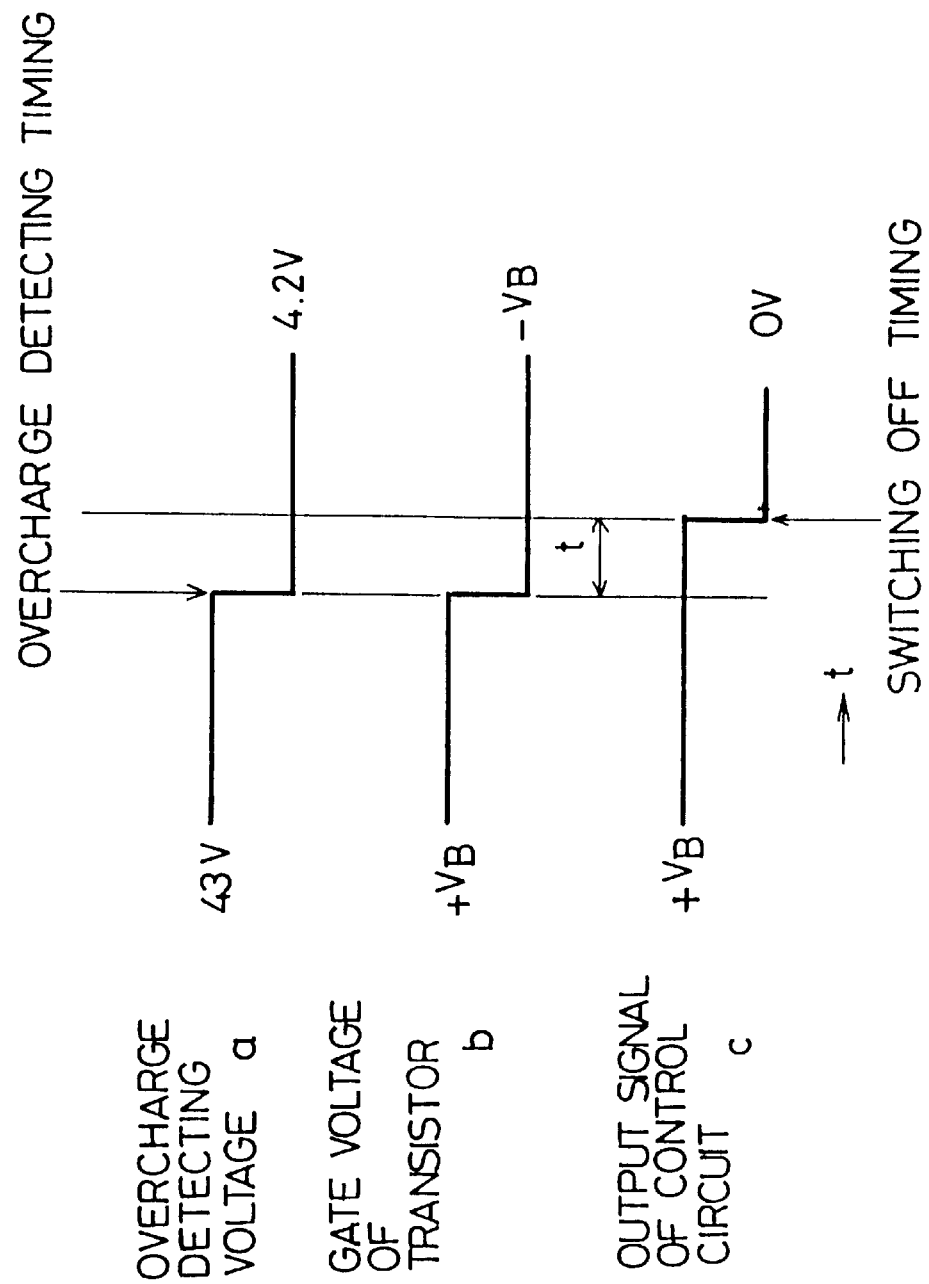
FIG. 18 is a timing chart diagram for signals of the charge/discharge control circuit according to the first embodiment of the second aspect of the invention.

FIG. 18 is a timing chart showing timing of the respective circuits. The detection voltage a for the overcharge is set reduced again to 4.2 V together with the secondary cell being charged at the overcharge voltage 4.3 V. For the purpose of reducing the voltage from 4.3 V to 4.2 V, the dividing voltage control transistor 5 is provided. The output of the voltage detection circuit 2 is fed back to the gate voltage of the transistor 5. Namely, when the voltage of the secondary cell is at 4.3 V, the output of he voltage detection circuit 2 is reversed from $+V_B$ to $-V_B$. The voltage of $-V_B$ is inputted into the transistor 5. The transistor 5 is turned on, and a divisional ratio of a breeder resistor is changed so that the voltage at the overcharge detection point is reset from 4.3 V to 4.2 V. The output signal $V_S$ of the control circuit is changed from $+V_B$ to 0 V Δt time after the resetting, to thereby output the signal for changing the switching circuit from "ON" to "OFF". In order to form Δt, the output of the voltage detection circuit 2 is delayed by a delay circuit.

The overdischarge detection has been explained. In the case of the overdischarge, it is possible to operate the system stably with the like structure. In the case where the overdischarge condition is detected, the reset level is set at an increased one opposite to the case of the overcharge.

A second embodiment of the second aspect of the invention will now be described with reference to the drawings.

Figure 19:
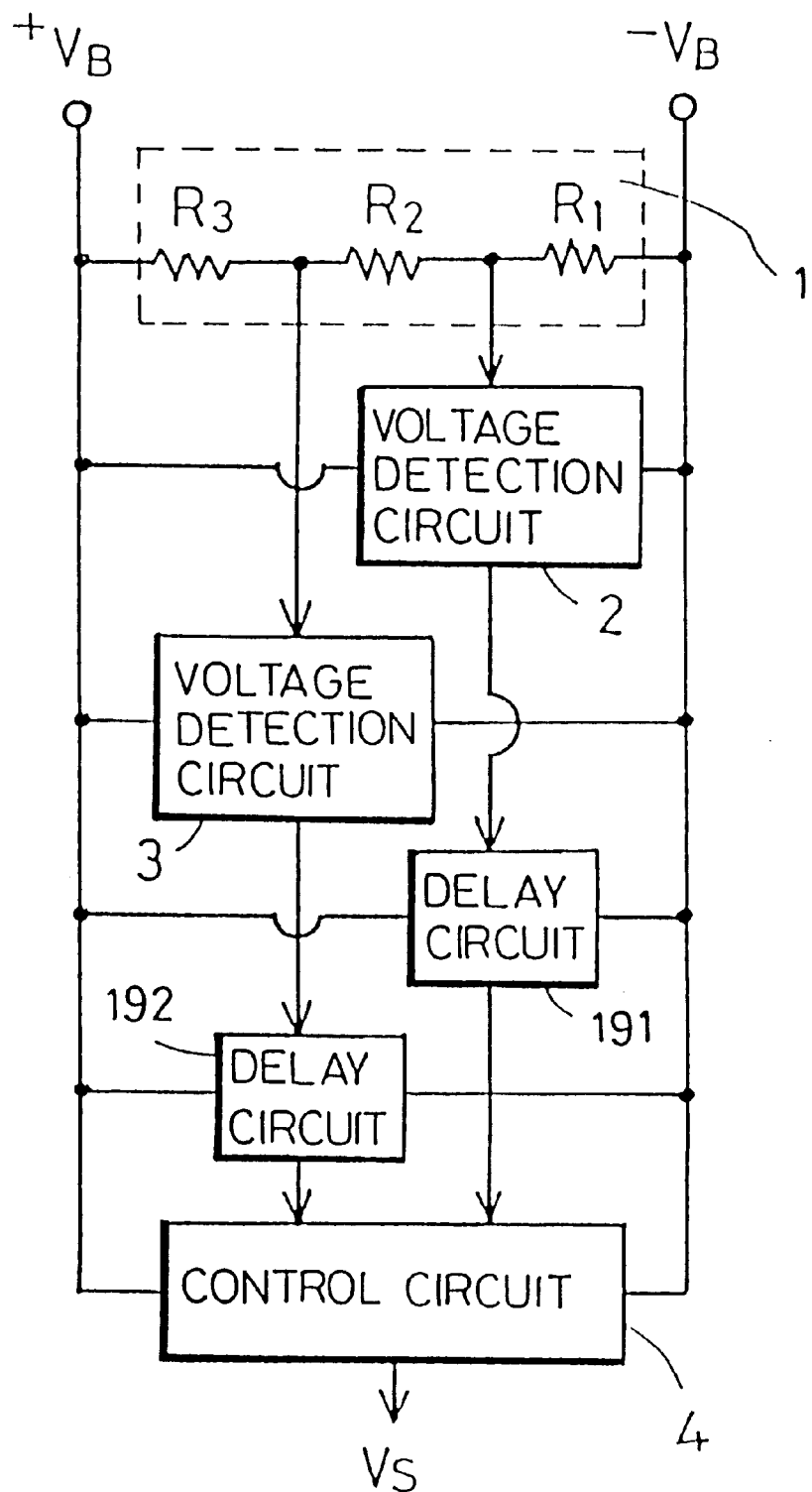
FIG. 19 is a circuit block diagram showing a charge/discharge control circuit according to a second embodiment of the second aspect of the invention.

FIG. 19 is a circuit block diagram showing a charge/discharge control circuit in accordance with the second embodiment of the second aspect of the invention. In the case where the charge/discharge control circuit is applied to an electric power source, it operates by using its secondary cell as a power source. Namely, the secondary cell is connected to the electric power source terminals $-V_B$ and $+V_B$ to supply an electric power. Voltage dividing resistors 1 of an electric power source serving as voltage dividing means for dividing the power source voltage, voltage detection circuits 2 and 3 for detecting the respective voltages of the two outputs of the power source, delay circuits 191 and 192 for delaying the output signals of the power source voltage dividing means on the time basis, and control circuit 4 for outputting a final control signal $V_S$ in accordance with the output signals of the delay circuits 191 and 192 are connected in parallel to the power source.

As shown in FIG. 3, each of the voltage detection circuits 2 and 3 is composed of a comparator circuit 41 receiving a reference voltage source 42 relative to the power source terminal $-V_B$ and the output of the voltage dividing resistor 1. The voltage detection circuit 2 is used for detecting an overcharge, and the voltage detection circuit 3 is used for detecting an overdischarge. An overcharged voltage detecting circuit for detecting the overcharge of the secondary cell as an electric power source is constituted by the voltage dividing resistor 1 and the voltage detection circuit 2. Also, an overdischarged voltage detecting circuit for detecting the overdischarge of the second cell as an electric power source is constituted by the voltage dividing resistor 1 and the voltage detection circuit 3. In the present invention, it is possible to separately provide the voltage dividing resistor for the inputs of the voltage detection circuits.

FIG. 19 shows an example of a charge/discharge control circuit in which the voltage dividing resistor 1 is commonly provided for the respective voltage detection circuits. The delay circuits 191 and 192 generate a time lag when the voltage detection circuits 2 and 3 detect the overcharge/overdischarge and the output signal is reversed. The control circuit 4 receives the signals relating to the overcharge/overdischarge of the secondary cell from each delay circuit 191, 192 and outputs the signal $V_S$ for turning on and off the switching circuit of the power source apparatus. For this reason, the control circuit 4 is composed of a logic circuit.

Although the switching circuit of the power source apparatus is turned on or off in accordance with the signal $V_S$, since it is necessary to change the signal $V_S$ for a constant period of time even if a capacitance or resistance component is present at the input terminal of the switching circuit, it is necessary to keep the impedance of the output terminal $V_S$ of the control circuit 4 at a low level. For example, if the control circuit 4 is made from MOSFET (Metal-Oxide-Semiconductor-Field-Effect-Transistor) devices, the number of the transistor elements forming the logic circuit is increased. At the same time, in order to keep the output terminal $V_S$ at a low impedance, it is necessary to enlarge the size of the final output stage. For this reason, when the control circuit 4 turns on or off the signal $V_S$, the penetration current is spent. The penetration current is generated not only in the control circuit 4 but also the voltage detection circuits 2 and 3 a timing which the output is reversed By these penetration current, the voltage of the secondary cell connected in parallel would be dropped.

Also, the control circuit 4 receives the signals from the delay circuits 191 and 192 to thereby secure the logic of the signal $V_S$. However, if the logic level for the delay circuits 191 and 192 would be unstable during the initial connection with the battery, the signal $V_S$ outputted from the control circuit 4 does not form a logic in which the voltage of the secondary cell is detected correctly. Thus, the switching circuit 103 would malfunction. If these phenomena would be generated, even if a secondary cell having a normal voltage value would be connected to the charge/discharge control circuit, the charge/discharge would be forcibly controlled.

The delay circuits 191 and 192 are provided for avoiding this malfunction. More specifically, a time lag is generated after the signals of the voltage detection circuit 2 or 3 have been reversed, and the signals are then inputted into the control circuit 4. Therefore, at the time of voltage detection, the penetration currents are prevented from being generated simultaneously in the voltage detection circuit 2 or 3 and the control circuit 4. Also, due to the time lag, for example, during the charging operation, the secondary cell is kept at the overcharged voltage, and the charge to the secondary cell is continued until the signal $V_S$ of the control circuit 4 is reversed so that the voltage detection circuit 3 operates correctly. It is therefore possible to insure the operation of detection.

Figure 20:
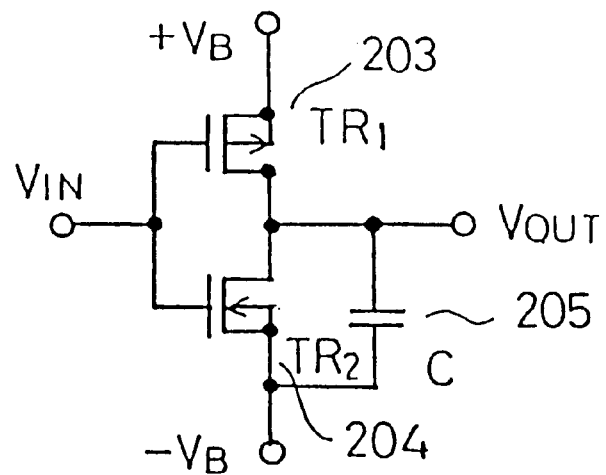
FIG. 20 is a circuit diagram showing a delay circuit according to the second embodiment of the second aspect of the invention.

Furthermore, the delay circuit is so constructed that the logic in the timing of the initial power supply is kept for a constant period of time. Specifically, as shown in FIG. 20, a capacitance 205 is connected between the output terminal $V_{out}$ and the power source terminal $-V_B$ by an inventor constituted CMOSFET between the power source terminals $+V_B$ and $-V_B$. In this case, when the signal that will be changed from $+V_B$ to $-V_B$ is fed into the input terminal $V_{IN}$ by the capacitance 205, a CR delay circuit can be generated a delay time and the impedance of the P-ch transistor 203 until the reverse signal that will be changed from $-V_B$ to $+V_B$ is outputted at the terminal $V_{OUT}$. Also, upon the connection with the secondary cell during the initial supply of the electric power source, the potential of the output terminal $V_{out}$ is subjected to a time lag by the capacitance 205 until it is kept at $+V_B$. Namely, at the initial stage, the voltage $-V_B$ is kept for a constant period of time.

Figure 21:
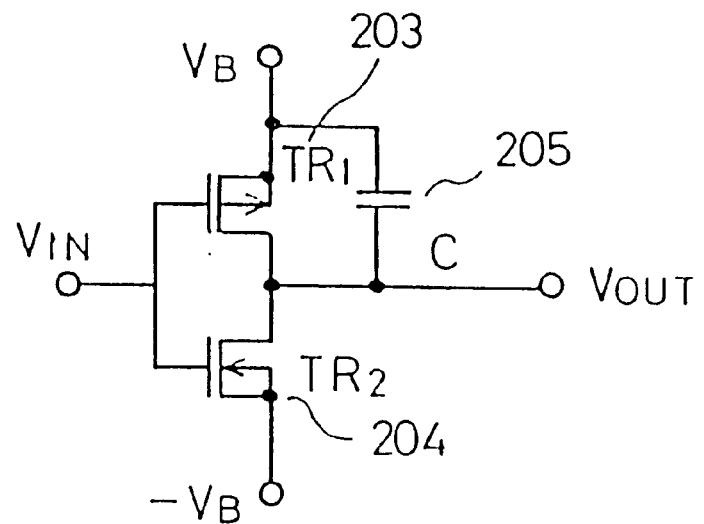
FIG. 21 is another circuit diagram showing a delay circuit according to the second embodiment of the second aspect of the invention.

In FIG. 20, the delay time is realized when the voltage at the input terminal $V_{IN}$ is changed from $+V_B$ to $-V_B$. However, in case of the delay is needed when the potential at the input terminal $V_{IN}$ is changed from $-V_B$ to $+V_B$, the capacitance 205 is connected, as shown in FIG. 21, between the output terminal $V_{OUT}$ and the power source terminal $+V_B$.

Figure 22:
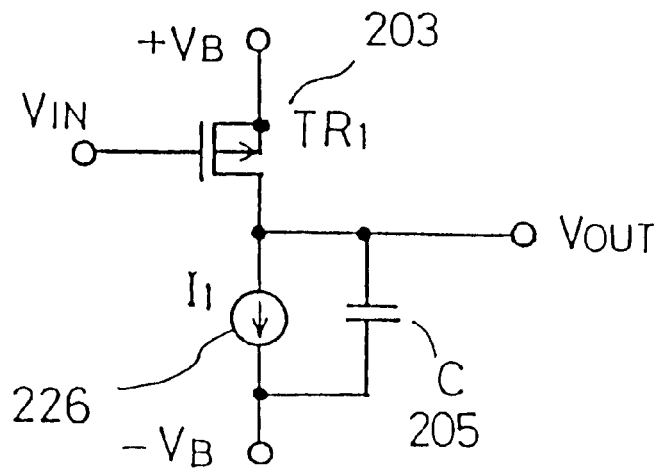
FIG. 22 is another circuit diagram showing a delay circuit according to further the second embodiment of the second aspect of the invention.

To form a delay circuit, as shown in FIG. 22, it may be constituted by a constant current circuit 226, the P-ch transistor 203 and the capacitance 205 resulting the same effect as that of the circuit shown in FIG. 20.

FIG. 22 shows the circuit for providing a time lag when the output terminal $V_{OUT}$ is changed from $+V_B$ to $-V_B$. In the initial power source supply stage, $-V_B$ is kept for a constant period of time.

Figure 23:
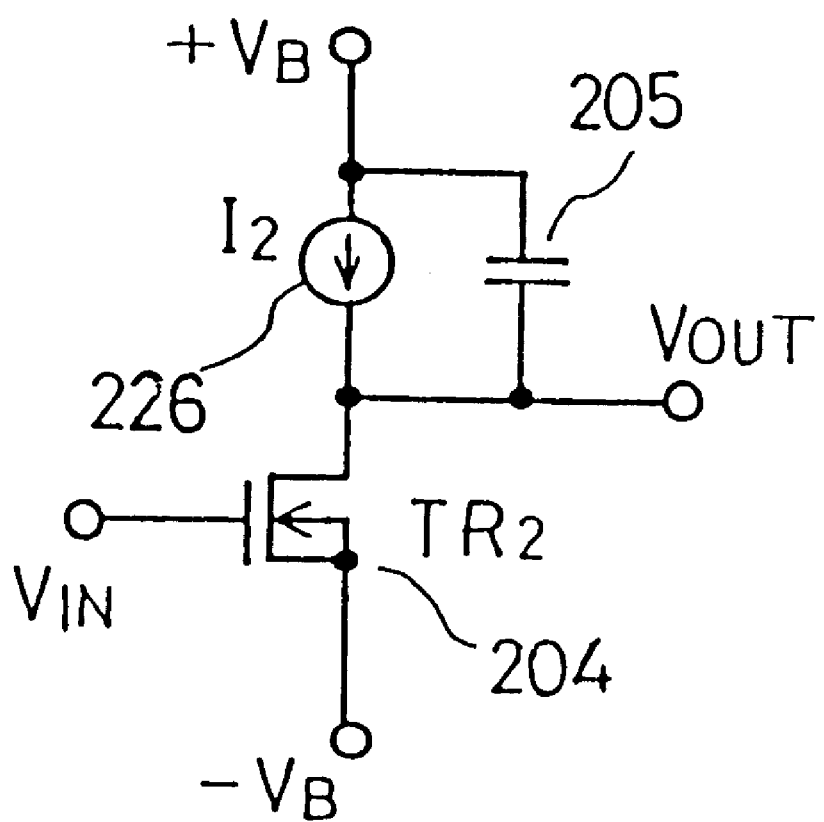
FIG. 23 is another circuit diagram showing a delay circuit according to further more the second embodiment of the second aspect of the invention.

With a circuit shown in FIG. 23, it is possible to generate a time lag when the output terminal $V_{OUT}$ is changed from $-V_B$ to $+V_B$. As described above, with the delay circuit arrangement, it is possible to set a time lag and a logic for timing of the initial power supply, as desired. Also, the delay circuit is explained with respect to the MOSFET, but any other suitable electronic components or elements may be used to ensure the same effect. These delay circuits are exemplary only and any other suitable circuits may be used instead thereof.

The charge/discharge control circuit according to the present invention is suitable for an IC provided on a single semiconductor substrate where the divided voltages of the voltage dividing resistors are stable.

A third embodiment of the second aspect of the invention will be described with reference to the drawings.

Figure 24:
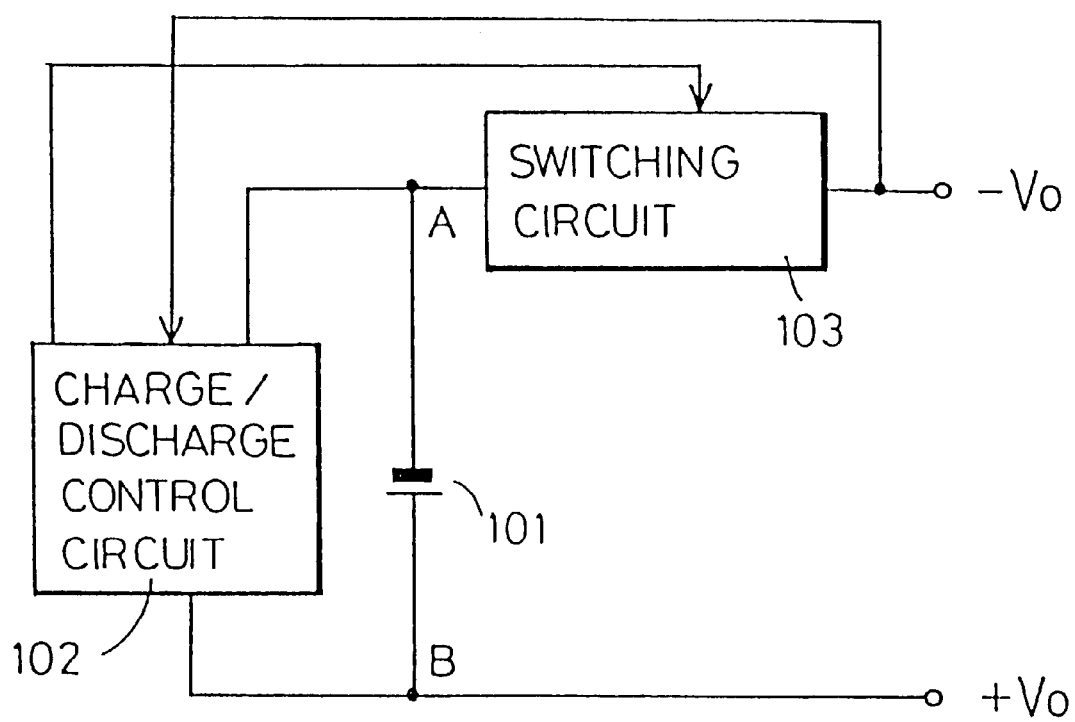
FIG. 24 is a circuit block diagram showing a chargeable electric power source apparatus according to a third embodiment of the second aspect of the invention.

FIG. 24 is a circuit block diagram showing a charge/discharge control circuit in accordance with the present invention. The difference from the conventional power source circuit is that the voltage of the terminal $-V_0$ is applied to the charge/discharge control circuit 102.

Figure 25:
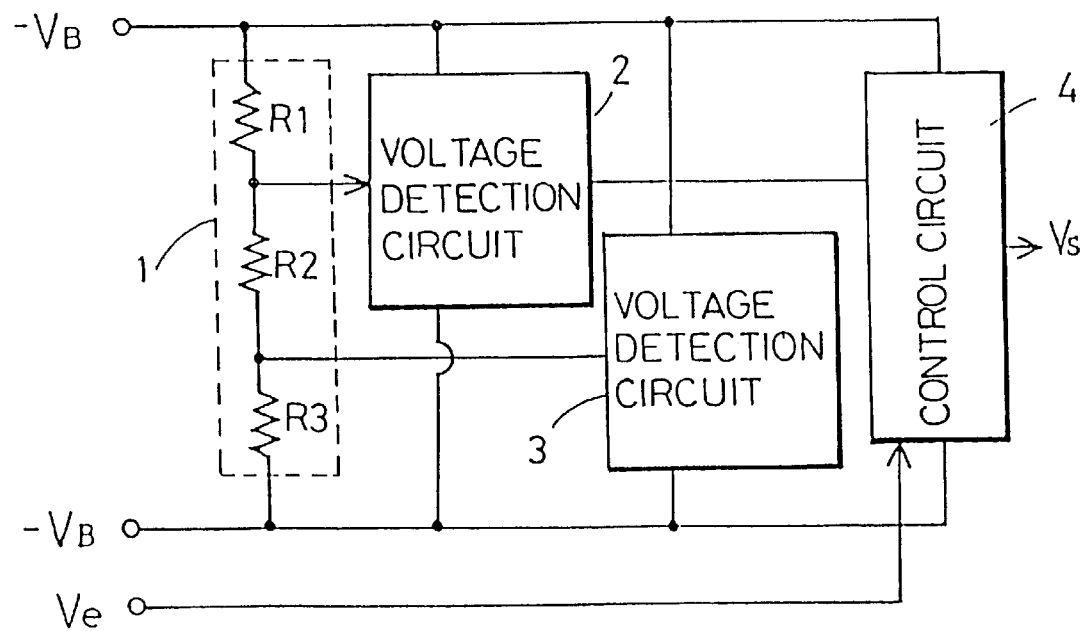
FIG. 25 is a circuit block diagram showing a charge/discharge control circuit according to the third embodiment of the second aspect of the invention.

FIG. 25 is a circuit block diagram showing a charge/discharge control circuit in accordance with a third embodiment of the second aspect of the invention. In the case where the charge/discharge control circuit is applied to an electric power source, it operates by using its secondary cell as a power source. Namely, the secondary cell is connected to the electric power source terminals $-V_B$ and $+V_B$ to supply an electric power. Also, an additional terminal $V_e$ according to the invention is connected to the external terminal $-V_0$ of the power source apparatus. Voltage dividing resistors 1 of an electric power source voltage dividing means for dividing the power source voltage, voltage detection circuits 2 and 3 for detecting the respective voltages of the two outputs of the power source, and a control circuit 4 for outputting a final control signal $V_S$ in accordance with the output signals of the voltage detection circuits 2 and 3 are connected in parallel to the power source.

According to the present invention, it is possible to separately provide the electric power source dividing resistor 1 for generating the divided voltages to be fed into the voltage detection circuits.

FIG. 25 shows the charge/discharge control circuit of an example in which the voltage dividing circuit 1 is commonly provided for each voltage detection circuit. The control circuit 4 receives the signals representative of the overcharge/discharge of the secondary cell from the respective voltage detection circuits 2 and 3 and the signal representative of the terminal $-V_0$ of the power source apparatus from the terminal $V_e$ and outputs the signal $V_S$ for turning on or off the switching circuit of the power source apparatus in accordance with the respective signals.

Namely the control circuit 4 is composed of a logic circuit and the power source is a secondary cell. Accordingly, when the voltage of the secondary cell is dropped further from the overdischarged condition, the signal $V_S$ of the control circuit 4 would be unstable. For example, if the output portion of the circuit 4 is composed of C-MOS (Complementary-Metal-Oxide-Semiconductor) invertor, a sufficient voltage to operate the circuit is given between $+V_B$ and $-V_B$ and if the same voltage as $-V_B$ is applied to the input terminal $V_{IN}$, the voltage of $-V_B$ is fed at the output terminal $V_S$. When the voltage between $+V_B$ and $-V_B$ becomes lower than the minimum allowable operation voltage, the voltage of $-V_B$ is not fed to the output terminal $V_S$. Since the output terminal $V_S$ of the control circuit is connected to the switching circuit of the power source apparatus, under the minimum allowable operation voltage of the control circuit, it is impossible to control of the charge/discharge of the power supply source. In this case, the following disadvantages would occur.

Figure 2:
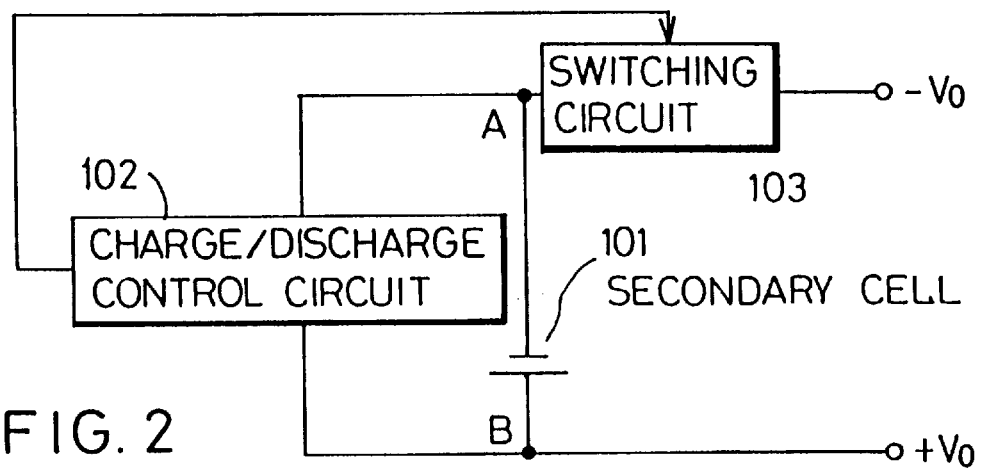
FIG. 2 is a circuit block diagram showing a conventional chargeable electric power source apparatus.

Namely, in the power source apparatus as shown in FIG. 2, the secondary cell 101 is kept under the charge/discharge condition, and the switching circuit 103 is turned off to thereby interrupt the supply of the energy to the external load. However, since the secondary cell 101 is connected to the charge/discharge control circuit 102, the energy corresponding to consumption current through the charge/discharge control circuit 102 is consumed in any event. Accordingly, after a relatively long time from the transition to the overdischarged condition, the secondary cell would be lower than the minimum allowable operation voltage of the control circuit 4, and the control signal $V_S$ shown in FIG. 25 would be unstable. Once the power source apparatus is kept under this condition, even if the charge is tried from a primary power source, the switching circuit operates unstably. In the worst case, it would be impossible to charge the cell. Accordingly, according to the present invention, in order to overcome this, the output portion of the control circuit 4 shown in FIG. 25 is constituted by that shown in FIG. 26. The power source for the C-MOS invertor is a voltage between $+V_B$ and $+V_e$. The voltage of the output terminal $V_S$ is also controlled by the voltage of the terminal $-V_B$.

As shown in FIG. 24, the terminal $+V_B$ is connected to the plus terminal of the secondary cell, the terminal $-V_B$ is connected to the minus terminal of the secondary cell and the terminal $V_e$ is connected to the external terminal $-V_O$.

When the charging is effected by the power source apparatus, the switching circuit 103 in FIG. 24 is turned on, so that the voltage of the terminal A becomes substantially the same as $-V_O$. Since the switching circuit 24 is turned in FIG. 24 when the power source circuit is discharged, the potential at the terminal A is substantially equal to that at the terminal $-V_V$. In the circuit shown in FIG. 26, a voltage of the secondary cell is applied between the terminals $+V_B$ and $V_e$, substantially the same potential as that of $V_e$ is applied to the terminal $-V_B$, and the N-ch transistor 269 is cut off. As a result, the output of the output terminal $V_S$ is controlled by the voltage of the terminal $V_{IN}$ to perform the same operation of the conventional CMOS invertor. The voltage of the secondary cell is reduced below the minimum allowable voltage of the circuit shown in FIG. 26, the signal of the output terminal $V_S$ would be unstable but the circuit would exhibit a stable operation when the charge is performed from the primary electric power source. During the charge, a voltage which is higher than a voltage of the secondary cell is applied between their terminals $-V_O$ and $-V_O$, in the circuit shown in FIG. 24. At this time, since the common voltage is applied to the plus terminal B of the secondary cell and the external terminal $+V_O$ to which the plus voltage of the charger is applied, the potential at the minus terminal A of the secondary cell is higher than that of the external terminal $-V_O$. Under this condition, in FIG. 26, the voltage from the charger is applied between the terminals $+V_B$ and $V_e$. In this case, since the potential difference between the terminals $+V_B$ and $-V_B$ is small, the N-ch transistor 269 is turned on so that the potential at C is kept at the same level as that of the terminal V. Accordingly, even if the voltage of the secondary cell is low when the charger is connected thereto, the potential at the output terminal $V_S$ of the control circuit is kept at the same as that the terminal $+V_B$, and control of the switching circuit may be insured.

Figure 26:
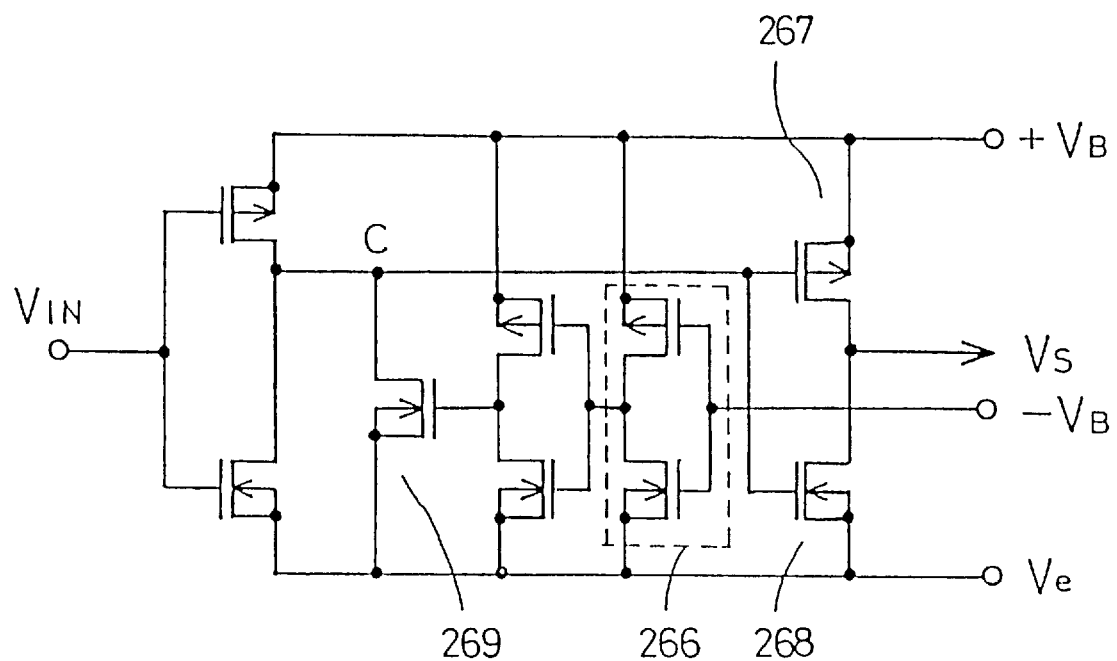
FIG. 26 is a diagram showing an example of an output portion of the control circuit according to the invention.

In the circuit of FIG. 26, when the voltage (between $+V_B$ and $-V_B$) of the secondary cell is smaller than the voltage (between $+V_B$ and Ve) of the charger, the inverter circuit 266 serves to turn on the N-ch transistor 269. The threshold voltage (reversed voltage) of the inverter circuit 266 may be changed by a size of the P-ch transistor or N-ch transistor. If the threshold voltage is set at a level above the minimum operable voltage of the control circuit 4, the operation thus far described may be insured.

Although the output portion of the control circuit has been described on the basis of the CMOS device structure for the sake of explanation, it is apparent to use any other suitable element. Also, it is possible to use any other suitable circuit for the output portion to solve the problem inherent in the conventional system.

A fourth embodiment of the second aspect of the invention will now be described with reference to the accompanying drawings.

Figure 27:
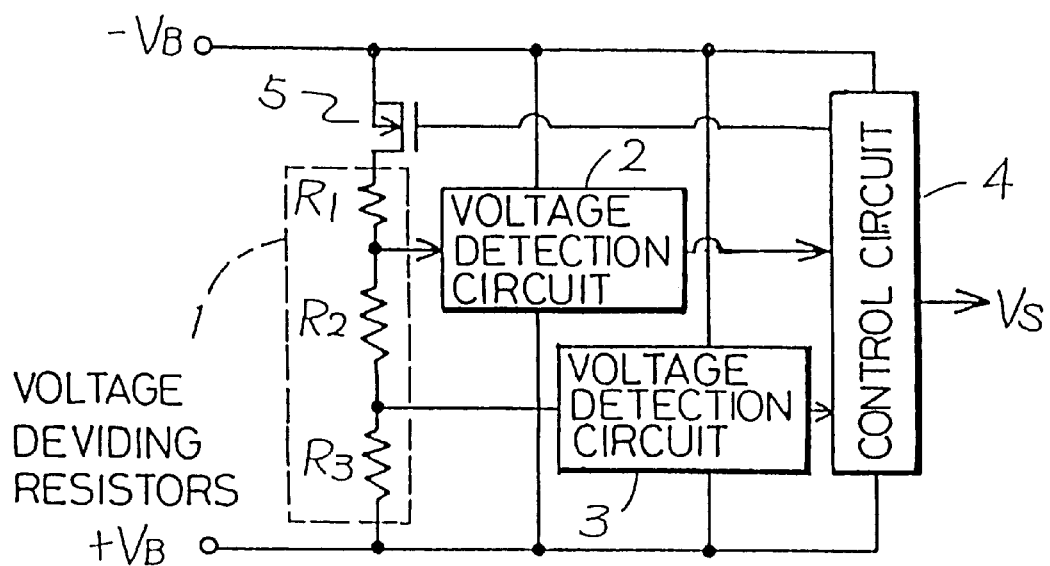
FIG. 27 is a circuit block diagram showing a charge/discharge control circuit according to a fourth embodiment of the second aspect of the invention.

FIG. 27 is a circuit block diagram showing the charge/discharge control circuit according to the fourth embodiment of the present invention. When the charge/discharge control circuit is applied to the electric power source apparatus, it is operated by using the secondary cell as a power source. Namely, the secondary cell is connected to the power source terminals $-V_B$ and $+V_B$ to form the power source.

Resistors 1 of an electric power source voltage dividing means for dividing the power source voltage, voltage detection circuits 2 and 3 for detecting the two output voltages of the power source voltage dividing means, respectively, and a control circuit 4 for outputting a final control signal $V_S$ in response to the output signals of the respective voltage detection circuits 2 and 3 are connected in parallel with the power source.

The voltage detection circuit 2 is used for detecting the overcharged condition, and the voltage detection circuit 3 is used for detecting overdischarged condition. The overcharge voltage detection circuit for detecting the overcharged condition of the secondary cell which is an electric power source is composed of voltage dividing resistors 1 and the voltage detection circuit 2. Also, the overdischarge voltage detection circuit for detecting the overdischarged condition of the secondary cell which is an electric power source is composed of voltage dividing resistors 1 and the voltage detection circuit 3. In the present invention, it is possible to separately provide the voltage dividing circuits for the inputs of the voltage detection circuits. FIG. 27 shows an example of a charge/discharge control circuit in which the voltage dividing circuit is commonly provided for the respective voltage detection circuits. The control circuit 4 receives the signals relative of the overcharge/overdischarge of the secondary cell from the respective voltage detection circuits 2 and 3 and outputs the signal $V_3$ for turning on and off a switching circuit of the power source apparatus.

Figure 28:
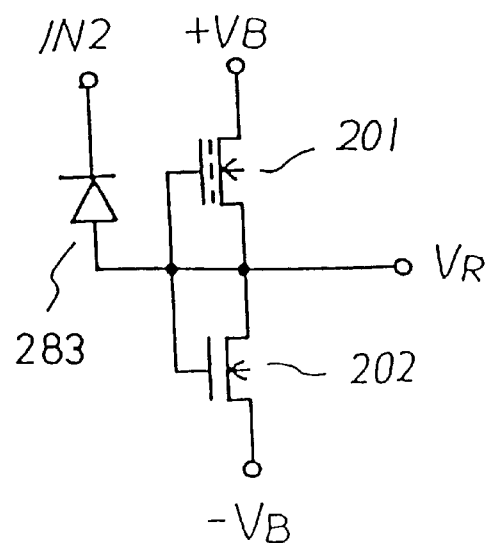
FIG. 28 is a circuit diagram showing a reference voltage circuit according to the fourth embodiment of the second aspect of the invention.

FIG. 28 is a circuit diagram showing a reference voltage circuit for generating a reference voltage to be inputted into comparator circuits of the voltage detection circuits 2 and 3. The voltage of the secondary cell is applied to both terminals of the reference voltage circuit.

The reference voltage circuit is a circuit which outputs from a connection between a transistor 201 and a transistor 202 a reference voltage $V_R$ that does not depend upon the voltage variation of the secondary cell. The transistor 201 is a depletion mode MOS-FET and the transistor 202 is an enhancement mode MOS-FET. The transistors 201 and 202 are both conductive type N-type transistors. The gate electrodes of both the transistors are connected to the reference voltage output terminals.

Furthermore, in the case where a semiconductor IC which forms a charge/discharge control circuit is composed of CMOS circuits, if a plus/minus reverse connection is effected to the power source, the charge/discharge control circuit is latched up. In case of the latch-up, an intermediate potential setting means is provided to the reference voltage output terminal $V_R$ for setting the output of the reference voltage circuit to an intermediate potential. In the embodiment shown in FIG. 28, the intermediate dividing voltage output IN2 of the voltage dividing resistors is applied to the reference voltage circuit through a diode 203. An intermediate dividing voltage output $IN_2$ is set at a substantially midpoint between the voltages $+V_B$ and $-V_B$ of the secondary cell. Accordingly, in case of the latch-up of the charge/discharge control circuit, the reference voltage output is reduced by approximately 0.6 V which is a voltage drop in the forward direction of the diode from the intermediate dividing voltage output $IN_2$. Since this value is substantially the midpoint voltage of the voltage of the secondary cell, the voltage detection circuit outputs a signal for turning off the switching circuit through the control circuit 4.

In case of the embodiment shown in FIG. 28, the means for setting the output of the reference voltage circuit of the voltage detection circuit is provided for preventing the malfunction of the switching circuit caused by the latch-up. If the switching circuit is turned off by the latch-up, it is possible to prevent the uncontrollable state. Accordingly, it is possible to modify the circuit so that the switching circuit is turned off when the output per se of the control circuit 4 is latched up.

The present invention is inevitable for CMOSIC that would malfunction due to the latch-up when the power source is subjected to a reverse polarity connection.

A fifth embodiment of the second aspect of the invention will now be described with reference to the drawings.

Figure 29:
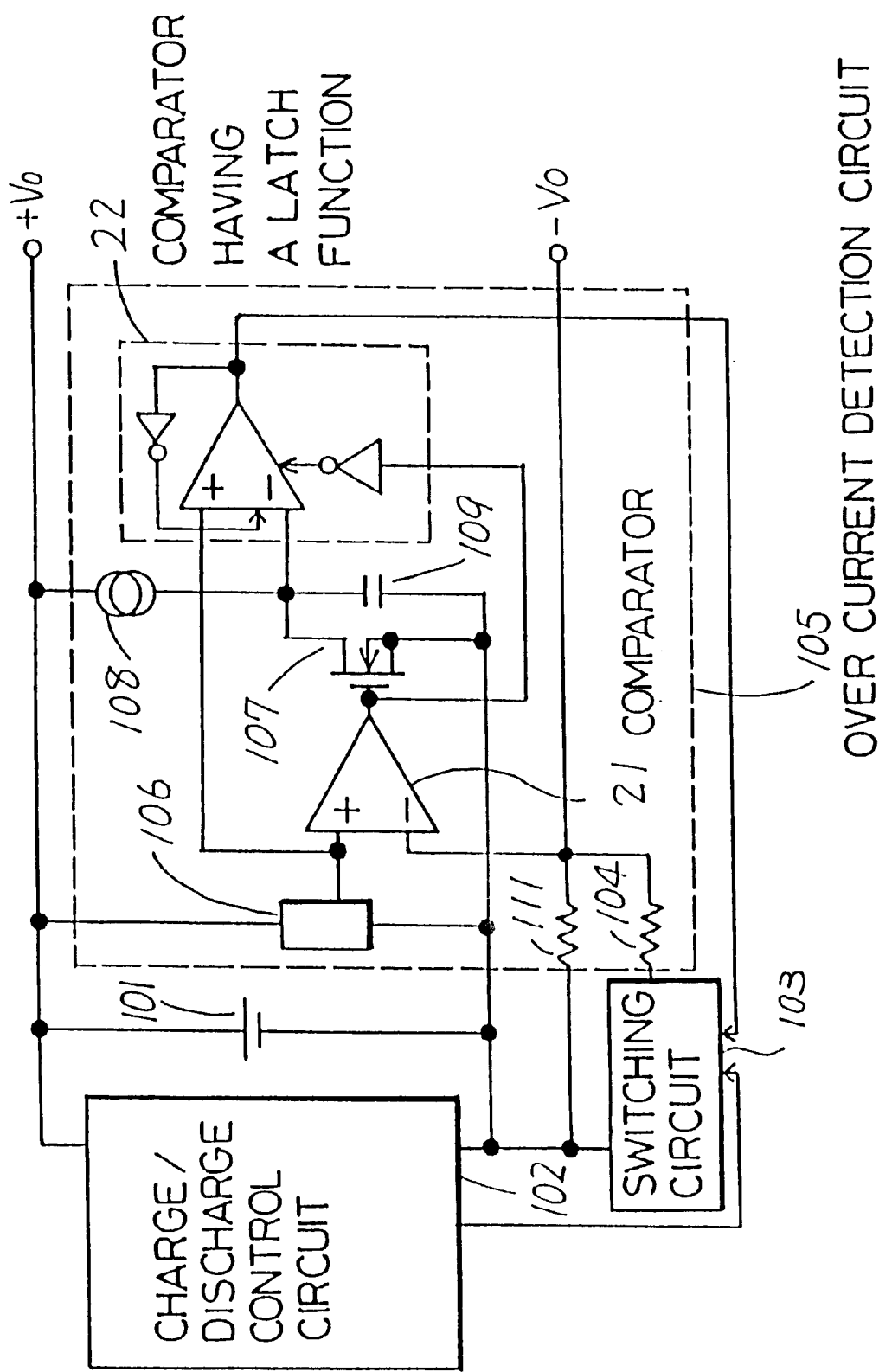
FIG. 29 is a circuit block diagram showing a chargeable electric power source apparatus according to the fourth embodiment of the second aspect of the invention.

FIG. 29 is a circuit block diagram showing a charge/discharge control circuit according to the fifth embodiment of the second aspect of the invention. In FIG. 29, external terminals $-V_0$ and $+V_0$, a switching circuit 103, a current sensing resistor 104, a secondary cell 101, a reference voltage circuit 106, a transistor 107, a constant current source 108, a capacitor 109, and a pull-down high resistor 111 are structured in the same way as those in FIG. 30.

Figure 30:
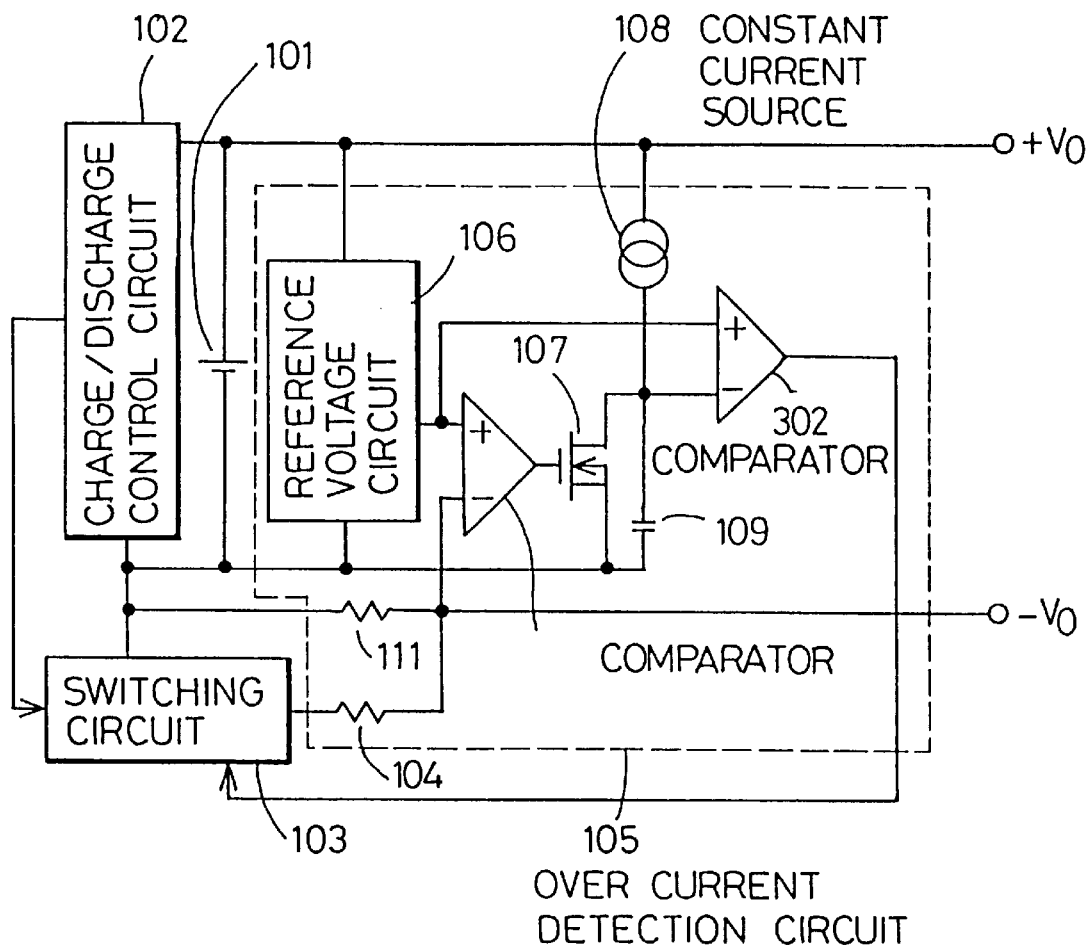
FIG. 30 is a conventional chargeable control circuit.

In the same way as shown in FIG. 30, when the current exceeds the level given by the above-described relation (1), the output of the comparator 21 is changed from "High" to "Low" to turn off the transistor 107 and charge the capacitor 109 by the constant current source 108. When the voltage of the capacitor 109 exceeds the voltage value $V_{REF}$ of the reference voltage 106, the output of the comparator 22 is changed from "High" to "Low" to thereby turn off the switching circuit 103. At this time, the comparator 22 has a latch function. Thus, the output of the comparator 22 is kept "Low" so that this condition is maintained.

The latch function is released by the output of the comparator 21.

Figure 31:
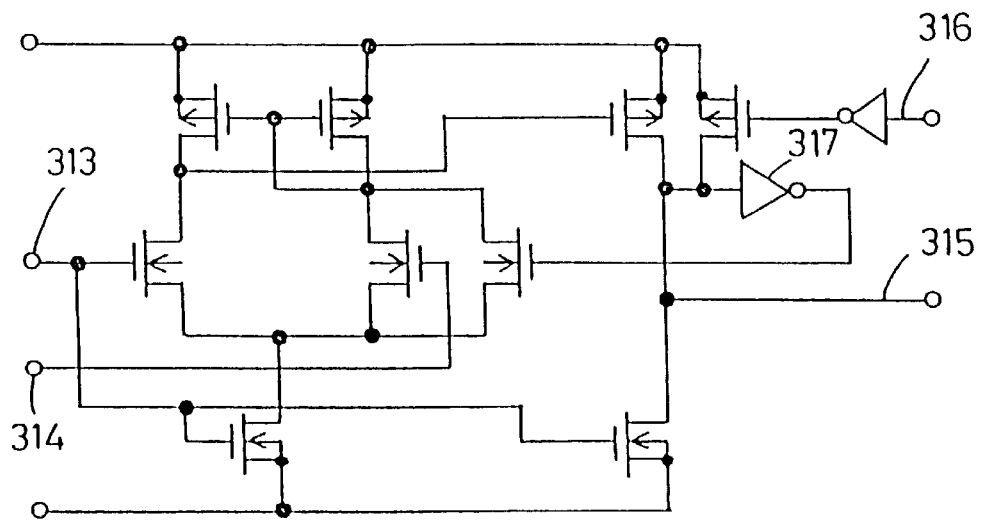
FIG. 31 is a circuit diagram showing a comparator having a latch function according to the invention.

FIG. 31 is a circuit diagram showing a comparator having a latch function. When the voltage at the minus input terminal 314 exceeds the voltage at the plus input terminal 313, the voltage of the output terminal 315 is kept "Low".

At this time, the output of the inverter 317 is kept "High" while the input on the minus side is kept "High". As a result, even if the voltage of the plus input terminal would be varied to some extent, the output of the comparator 22 having the latch function is latched to "Low".

During the connection with a load of electronic equipment such as a video tape recorder, since the switching circuit 103 is turned off, the input terminal of the comparator 21 on the minus side is pulled up to $+V_0$ by the load, so that the overcurrent condition is maintained.

Thereafter, when the load is removed, the pull-down high resistor 111 causes the minus input voltage of the comparator to be reduced to "Low", the output of the comparator 21 is kept "High". Since the latch release terminal 316 of the comparator 21 having the latch function is kept "High", the output of the latch function provided comparator 22 is kept "High" to thereby release the latch.

In FIG. 29, the overcurrent detection circuit is composed of a voltage detector for detecting the voltage between both terminals of the overcurrent detecting resistor 104 provided between the external terminal $-V_0$ and the switching circuit 103, a delay circuit for delaying the output of the voltage detector on the time lag basis, and a latch-up function provided voltage detecting circuit for detecting a voltage of an output of the delay circuit. The voltage detecting circuit is composed of the reference voltage generating circuit 106 and the comparator circuit 21. The delay circuit is composed of the constant current source 108, the capacitor 109 and the transistor 107. In the foregoing explanation, the charge/discharge control circuit 102 and the overcurrent detection circuit 105 are separately provided by way of example.

It is however possible to assume that the charge/discharge control circuit includes both the charge/discharge circuit 102 explained in the foregoing embodiments and the overcurrent detecting circuit 105.

Figure 32:
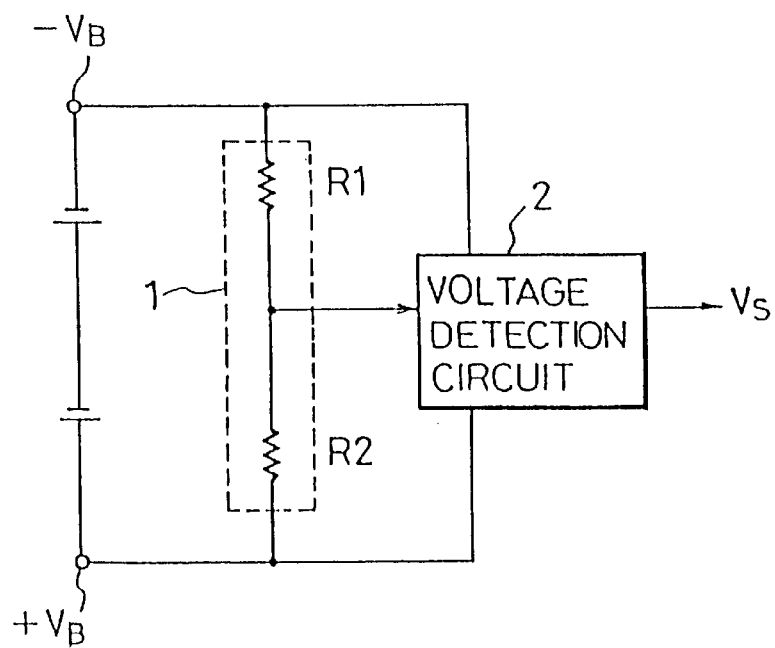
FIG. 32 is a circuit block diagram showing a charge/ discharge control circuit according to a first embodiment of a third aspect of the invention.

FIG. 32 is a circuit block diagram showing a charge/discharge control circuit according to a first embodiment of a third aspect of the invention. In the case where the charge/discharge control circuit is applied to an electric power source, it operates a secondary cell as an electric power source. Namely, in this case, the two secondary cells are connected in series to power source terminals $-V_B$ and $+V_B$ as the electric power source. The voltage dividing resistors 1 of an electric power source voltage dividing means for dividing the power source voltage, and a voltage detection circuit 2 for detecting the output voltage of the power source voltage dividing means are connected to the electric power source.

Figures 34A, 34B:
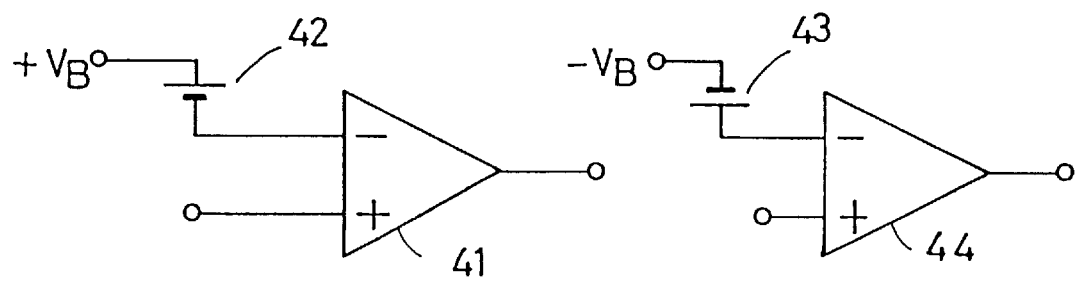
FIG. 34 is a circuit diagram showing a voltage detector.

The voltage detecting circuit 2 is composed of a reference voltage source 43 for the power source terminal $-V_B$ and a comparator 44 for receiving the output of the voltage dividing resistors 1 as an input therefor specifically shown in FIG. 34. A circuit for detecting a sum of voltage of secondary cells used as the power source is composed of the voltage dividing resistors 1 and the voltage detecting circuit 2. The voltage detecting circuit 2 outputs a signal Vs for turning on and off the switching circuit of the power source apparatus.

The charge/discharge control circuit according to the present invention is suitable for an IC provided on a single semiconductor substrate in which the dividing voltage of the voltage dividing resistors 1 would be varied in a narrow range. It is apparent that the invention may be applied to the case where three or more secondary cells are connected in series with each other.

As has been described above, the sums of voltage of the respective cells formed of the secondary batteries are detected to thereby enable the suitable charge/discharge control even under the condition where the respective cells are locally consumed. As a result, it is possible to enhance the service life of the secondary batteries.

A second embodiment of the third aspect of the invention will now be described with reference to the drawings. In the circuit shown FIG. 33 a voltage detecting circuit 3 detects an overcharge voltage $V_1$ of a secondary cell 6, and a voltage detecting circuit 5 detects an overcurrent voltage $V_2$ of a secondary cell 7 respectly and the control circuit outputs the output signal $V_S$. At the same time, the voltage of the secondary cell 6 is detected by the voltage detecting circuit 2, and it is assumed that the detection voltage $V_3$ be smaller than the overcharge voltage $V_1$. Also, in the same manner, the voltage of the secondary cell 7 is detected by the voltage detecting circuit 4, and it is assumed that the detection voltage $V_4$ be smaller than the overcharge voltage $V_2$. The output signals of the voltage detecting circuits 2 and 4 are inputted to the voltage detecting circuits 5 and 3 to change the voltage values of the overcharge detecting voltages $V_2$ and $V_1$ of the voltage detecting circuits 5 and 3.

More specifically, in the case where the charger is connected from the outside to the terminals $+V_B$ and $-V_B$ and the secondary cells 6 and 7 are to be charged, the intrinsic overcharge detection voltage $V_1$ and $V_2$ of the voltage detecting circuits 3 and 5 are 4.2 V. However, in the case where, for instance, the secondary cell 6 suffers from an accident and its chargeability performance is considerably degraded, only the secondary cell 7 is charged so that the difference in voltage between both cells 6 and 7 is increased. In order to avoid this, if the detection voltage $V_3$ of the voltage detecting circuit 2 would be set at about 3.2 V, in the case where the voltage of the secondary cell 6 would not exceed 3.2 V, the detection voltage $V_2$ of the voltage detecting circuit 5 is set at a value less than 4.2 V, and in the case where the voltage of secondary cell would exceed 3.2 V, the detection voltage $V_2$ of the voltage detecting circuit 5 is set at the intrinsic detecting voltage value of 4.2 V. The setting is carried out in accordance with the output signal of the voltage detecting circuit 2.

In the same way, the degradation of the secondary cell 7 is monitored in accordance with the output signal of the voltage detecting circuit 4. In the case where the voltage of the secondary cell 7 would not exceed 3.2 V due to the degradation of the cell, the detection voltage $V_1$ of the voltage detecting circuit 3 is set at a value less than 4.2 V, whereas in the case where the voltage of the secondary cell 7 would exceed 3.2 V, the detection voltage $V_1$ is set at 4.2 V. The setting is carried out in accordance with the output signal of the voltage detecting circuit 4.

In the foregoing explanation, the voltage values of 3.2 V and 4.2 V have been used by way of example. It is however apparent that these values depend upon the characteristics of the cells and the values should not be limited thereby and thereto.

Figure 33:
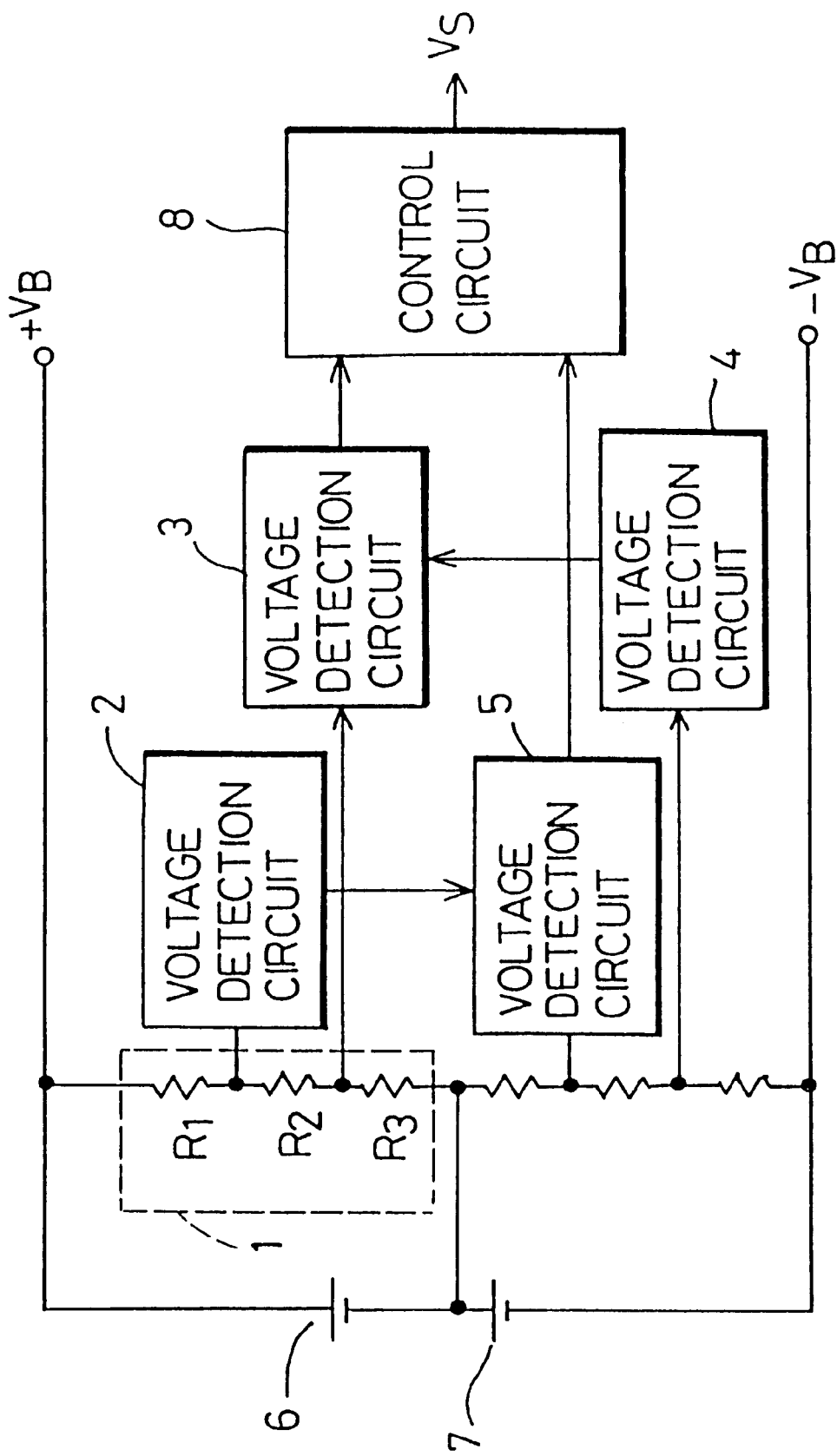
FIG. 33 is a circuit block diagram showing a charge/ discharge control circuit according to a second embodiment of the third aspect of the invention.
Figure 35:
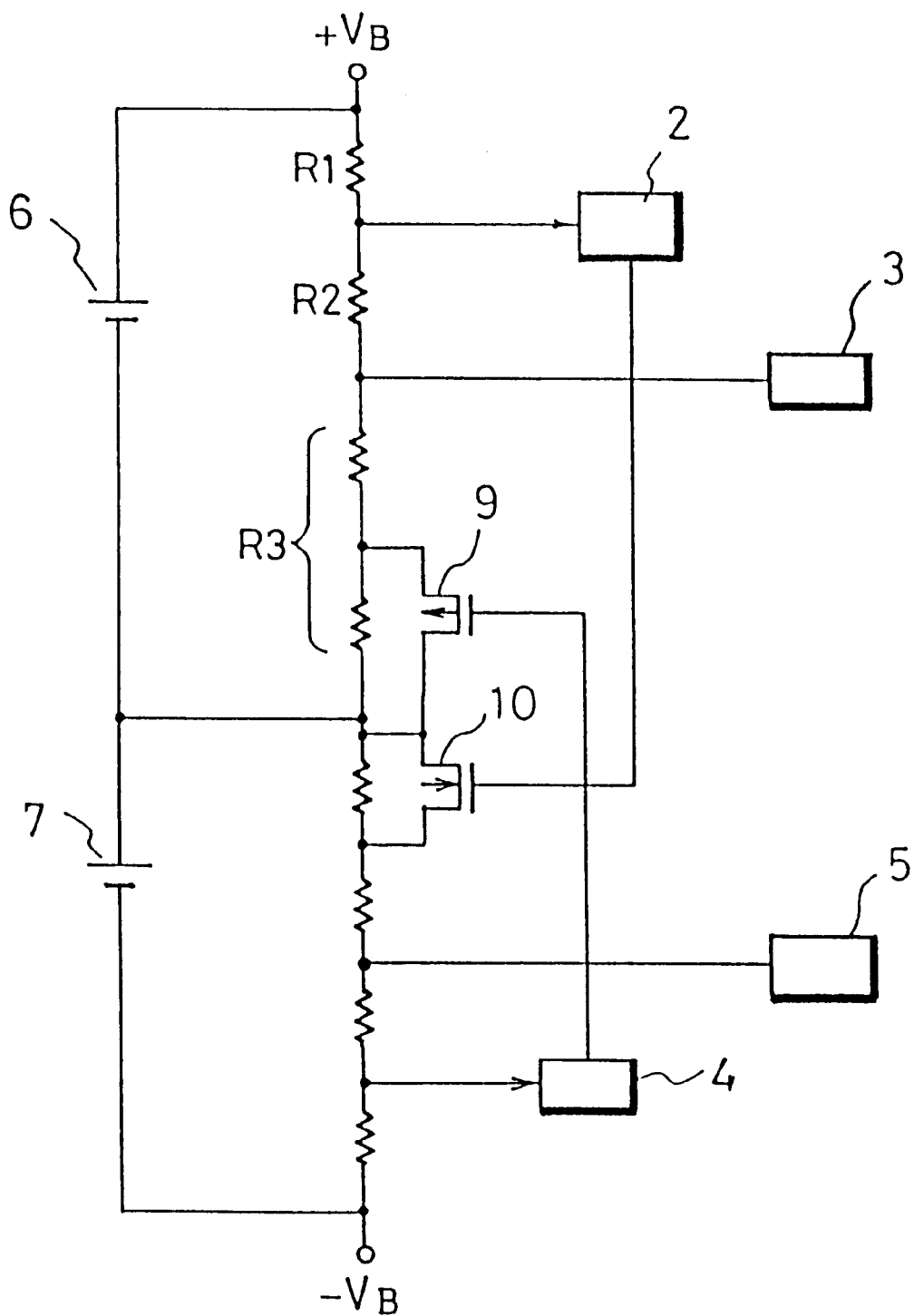
FIG. 35 is a circuit block diagram showing a charge/ discharge control circuit according to the second embodiment of the third aspect of the invention.

The specific circuits for realizing the block diagrams shown in FIGS. 35 and 33 will be explained. The output of the voltage detecting circuit 4 is inputted into a gate of a transistor 9 connected in parallel to a part of a resistor R3. The overcharge detection voltage value $V_1$ of the voltage detecting circuit 3 is changed by turning on and off the transistor 9.

In the same way, the output of the voltage detecting circuit 2 is used to change the overcharge detection voltage V2 of the voltage detecting circuit 5 by turning on and off the transistor 10 connected in parallel to a part of the resistor connected in parallel to the secondary cell 7.

Figure 36:
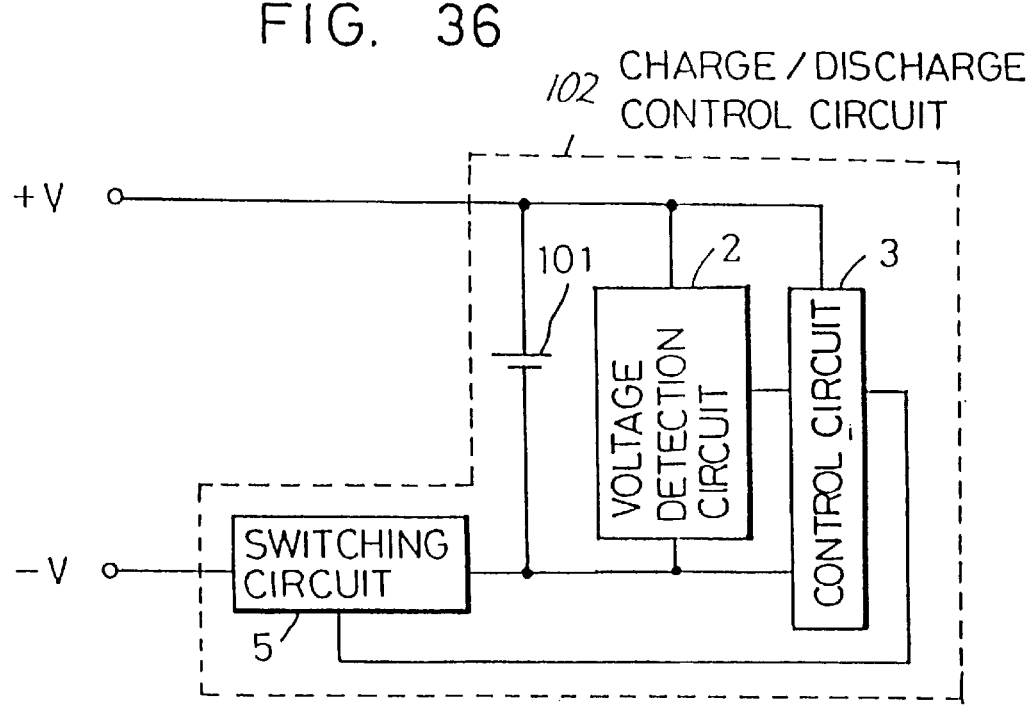
FIG. 36 is a circuit block diagram showing a chargeable electric power source according to the invention and the charge/discharge control circuit according to the third embodiment of the third aspect of the invention.
Figure 37:
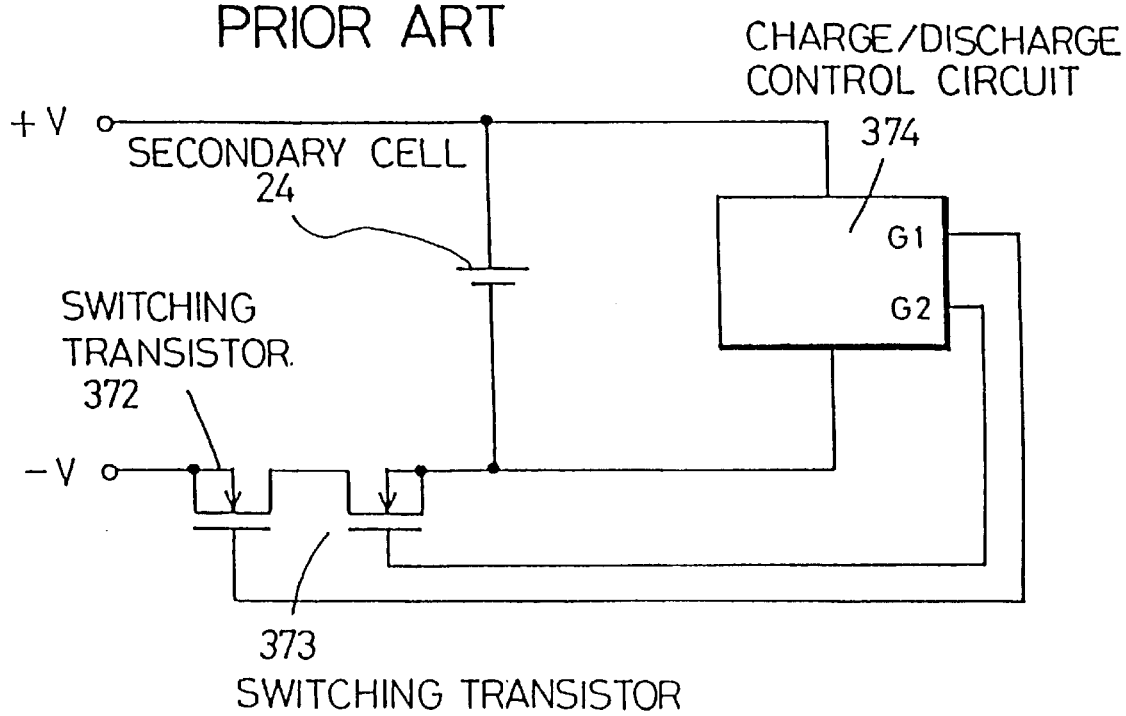
FIG. 37 is a circuit block diagram showing a conventional chargeable power source apparatus.

FIG. 36 is a block diagram showing a chargeable type electric power source apparatus and a charge/discharge control circuit therefor according to the invention. A secondary cell 101, a voltage detecting circuit 2 for detecting the voltage of the secondary cell 101 and a control circuit 3 for controlling an impedance of a switching circuit 5 are connected in parallel to external terminals +V and −V. The switching circuit 5 is connected in series between the secondary cell 101 and the external terminal −V to effect the electric connection between the secondary cell 101 and the external terminal in accordance with an electric control. The control circuit 3 receives an output of the voltage detecting circuit 2, logically processes and it outputs a signal for turning on and off the switching circuit 5.

For instance, in the case where the power source is connected to the external terminals for charging the secondary cell 101, if the voltage of the secondary cell 101 exceeds an overcharge voltage level of the secondary cell 101, a signal of the voltage detecting circuit 2 is reversed to be inputted into the control circuit 3. The control circuit 3 sends a signal for turning off the switching circuit 5 to stop the charging. Inversely, in the case where electric equipment such as a video camera which consumes an electric power is connected to the external terminals +V and −V and the electric power is supplied from the secondary cell 101 to the electric equipment, if the voltage of the secondary cell 101 is lower than the overdischarge voltage level, the signal of the voltage detecting circuit 2 is reversed to a signal opposite the regular voltage range. Then, the control circuit 3 outputs a signal for turning off the switching circuit 5 to stop the discharge. The "regular voltage range" means an intermediate state between the overcharged condition and the overdischarged condition.

In the above-described charge/discharge control circuit, the voltage detecting circuit 2, the control circuit 3 and the switching circuit 5 may be formed of a semiconductor IC disposed on a single substrate.

Figure 38:
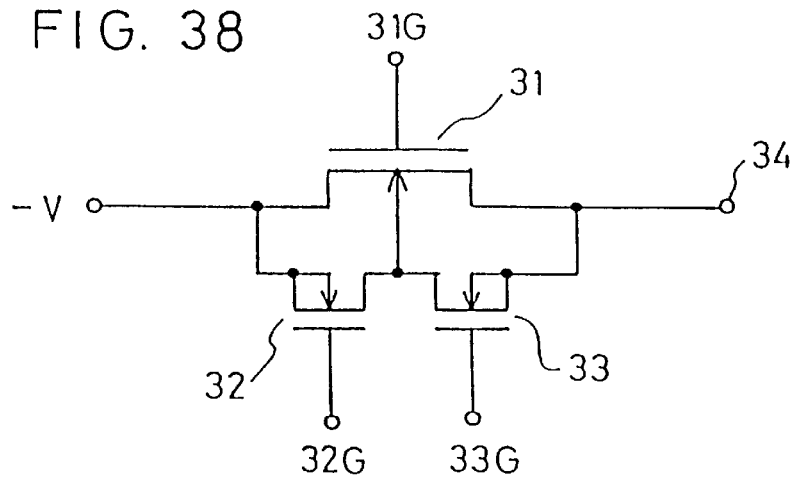
FIG. 38 is a circuit diagram showing a switching circuit of the charge/discharge control circuit according to the third aspect of the invention.

FIG. 38 is a circuit diagram showing a switching circuit used in the charge/discharge control circuit according to the embodiment of the invention. The switching circuit is formed between the external terminal −V and the minus terminal 34 of the secondary cell. An N-type insulation gate field effect transistor (hereinafter referred to as an N-type MISFET) 31 is provided between the external terminal −V and the minus terminal 34 of the switching circuit. An N-type MISFET 32 and an N-type MISFET 33 are provided between the substrate of the N-type MISFET 31 and the external −V/minus terminal 34 of the secondary cell. Gate electrodes 31G, 32G and 33G of the three N-type MISFETs are controlled by the control circuit.

For instance, in the case where the power source is connected to the external terminals for charging the secondary cell, the transistors 31 and 32 are turned on, and the transistor 33 is turned off. Under the overcharged condition, the output of the voltage detecting circuit is reversed so that the signal for turning off the switching circuit is outputted by the control circuit. Namely, the transistors 31 and 33 are turned off and only the transistor 32 is kept turned on.

In the case where the portable equipment such as a video camera or the like is connected to the external terminal so that an electric power is supplied from the secondary cell to the portable equipment, the switching circuit shown in FIG. 38 is controlled so that it is turned on. Namely, the transistors 31 and 33 are turned on but the transistor 32 is turned off. Under the overdischarged state, the output signal of the voltage detecting circuit is reversed, the signal for turning off the switching circuit is fed from the control circuit.

Namely, the transistors 31 and 32 are turned off but only the transistor 33 is kept turned on.

Under the regular state, in order to detect whether the system is under the charged condition or discharged coition, the voltages of the external terminal −V and the minimum terminal 34 of the secondary cell are compared with each other. The charged condition and the discharged condition are detected and the impedances of the transistors 32 and 33 are controlled by the control circuit.

Namely, the control circuit has a function to detect the discharge/charge.

In the switching circuit described above in conjunction with FIG. 38, the number of the transistors through which a current flow is one (only the transistor 31). Accordingly, in general, the transistor which has a large current drive capability may be formed of half the conventional components in order to reduce the voltage drop through the switching circuit. Each of the transistors 32 and 33 of the switching circuit of the IC for controlling the discharge/charge according to the present invention is a switching transistor for selectively connecting the substrate of the current drive transistor 31 to one of the external terminal and the minus terminal of the secondary cell. Therefore, small current drive capability of the transistors 32 and 33 for switching the substrate potential will suffice. In general, the current drive capability of the transistor 31 should be several amperes, whereas the current drive capability of the transistors 32 and 33 is one thousandth of that of the transistor 31 or less. In the case where the circuit is formed into ICs, the area of the transistors 32 and 33 is small enough to be negligible.

As described above, with the switching circuit as shown in FIG. 38, it is possible to enhance the current drive capability of the current drive transistor up to about twice as much as the conventional system. Accordingly, it is possible to reduce the area of the transistor for the same current drive capability to about half that of the conventional system. This facilitates the compactness of the circuit. Also, the potentials of the substrates of the respective transistors may be electrically separated by N-wells. Accordingly, it is facilitate the provision of the transistors on the same semiconductor substrate. However, the transistors 31, 32 and 33 may operate in the same manner even if they are composed of separate transistors.

Figure 39:
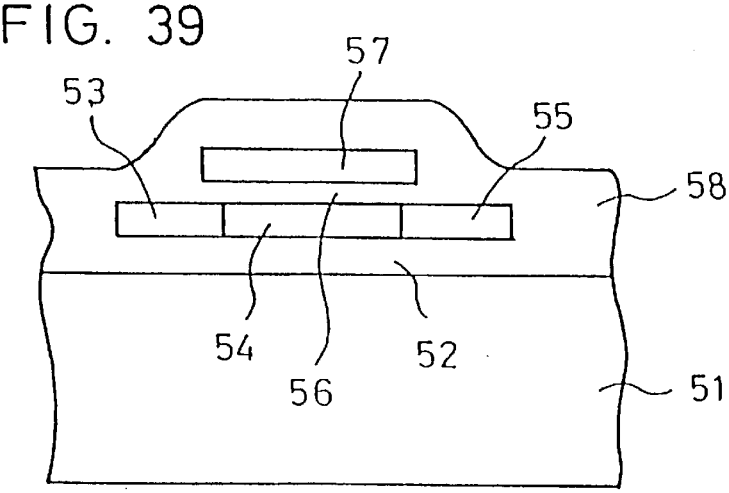
FIG. 39 is a cross-sectional view showing a transistor used in the charge/discharge control circuit according to the third aspect of the invention.

FIG. 39 is a cross-sectional view showing a transistor for a charge/discharge control circuit according to the invention. The transistor is formed of mono-crystalline silicon films 53, 54 and 55 laid on an insulation film 52 on a silicon substrate 51. In general, the substrate having the mono-crystalline silicon films formed on the insulation film is called an SOI substrate. The SIP substrate is used to form the transistor having the cross section as shown in FIG. 39. Namely, an N-type source region 53 and an N- type drain region 55 are provided on both sides of a channel forming region 54, and a gate electrode 57 is provided through a gate insulation film 56 on the channel forming region 54. With the structure for the transistor as shown in FIG. 39, the potential of the channel forming region 54 which is a part of the substrate of the transistor may be formed electrically independent of the transistor formed on the same substrate. Namely, the substrate potentials of the transistors may be electrically separated from each other so that an IC for the charge/discharge control circuit having the switching circuit may readily be formed.

Figure 40:
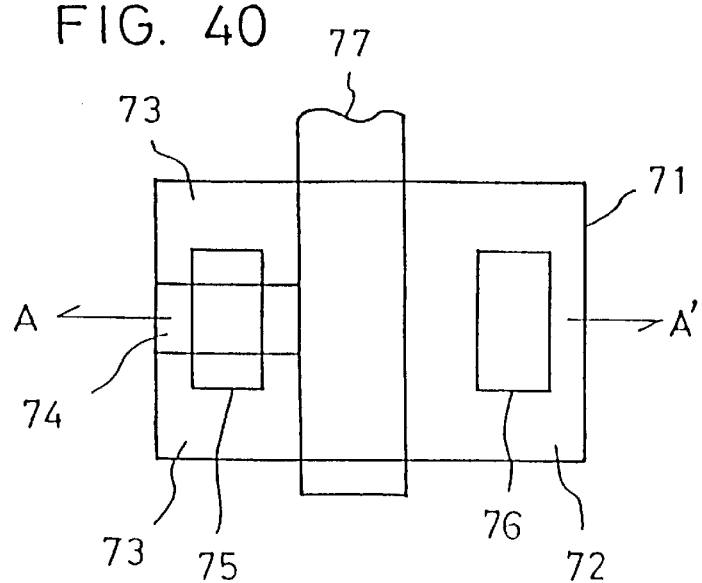
FIG. 40 is a plan view showing the transistor used in the charge/discharge control circuit according to the third aspect of the invention.

FIG. 40 is a plan view showing a transistor in which the potential of the channel forming region which is a substrate is the same as the potential of the source region. An N-type source region 73, a drain region 72 and a channel forming region between the regions 72 and 73 are formed in a mono-crystalline semiconductor film 71 formed on an insulation film, and a gate electrode 77 is provided through the gate insulation film on the channel forming region. A P-type source region 74 is provided in a part of the source region 73, so that the potential of the source region 73 is kept at the same potential as the channel forming region by the source electrode 75.

Figure 41:
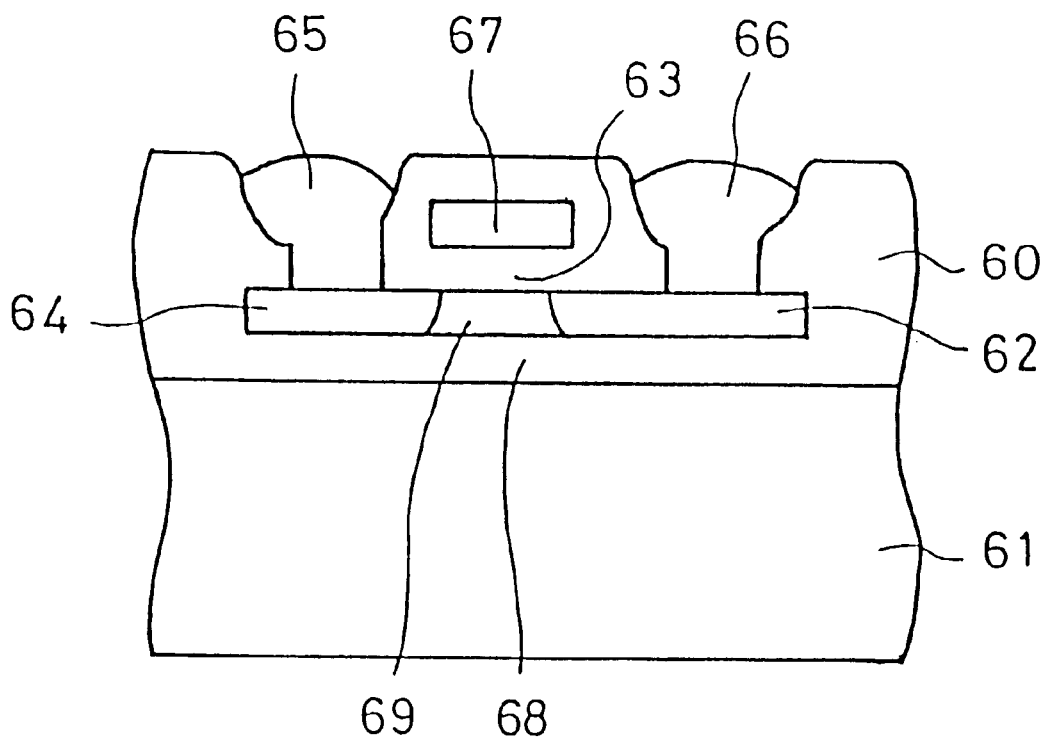
FIG. 41 is a cross-sectional view showing the transistor taken along the line A–A' of FIG. 35.

FIG. 41 is a cross-sectional view taken along the line A–A' of FIG. 40. The mono-crystalline semiconductor film 71 is provided through an insulation film 68 on the silicon substrate 61. A P-type source region 64, a P-type channel forming region 69 and an N-type drain region 62 are formed in the mono-crystalline silicon semiconductor film 71. A gate electrode 67 is provided through a gate insulation film 63 on the channel forming region 69. The P-type source region 64 and the N-type source region are connected to a source electrode 65. The P-type source region 64 and the N-type source region are connected to the source electrode 65. The N-type drain region 62 is connected to a drain electrode 66.

Figure 42:
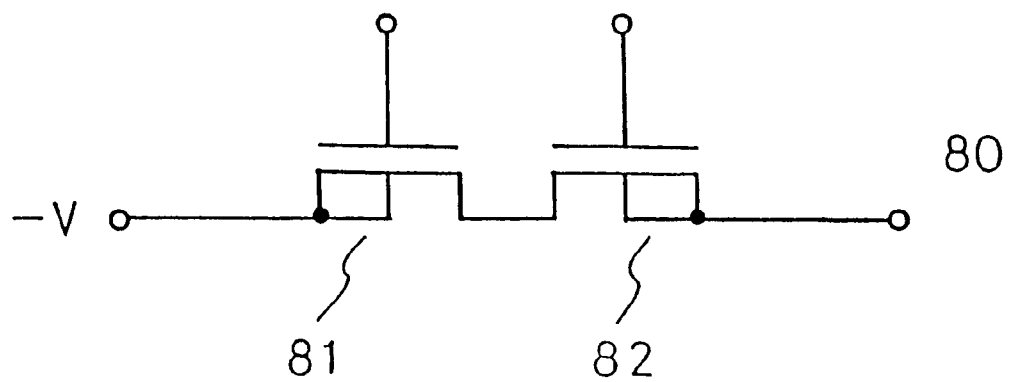
FIG. 42 is a circuit diagram showing the switching circuit of the charge/discharge control circuit according to the third aspect of the invention.

FIG. 42 is a circuit diagram showing a switching circuit for a charge/discharge control circuit according to the present invention, which circuit is constituted by using a transistor type MISFET as shown in FIG. 41. N-type MISFETs 81 and 82 using an SOI substrate are connected in series between the external terminal −V and the minus terminal 80 of the secondary cell. The substrates of the transistors 81 and 82 are connected so as to be held at the same potentials as the external terminal and the terminal of the secondary cell, respectively. By using the SOI substrate, it is possible to set the respective potentials of the substrates at different levels.

As described above, according to the present invention, it is possible to realize a charge/discharge control circuit in which the switching circuit is located on the same substrate.

In the charge/discharge control circuit according to the present invention, it is advantageously possible to reduce the consumption current with the structure in which the consumption current reducing switching element is provided to the voltage dividing resistors for the overcharge and overdischarge detecting circuits provided internally of the charge/discharge control circuit. Also, it is possible to provide an electric power source apparatus by the charge/discharge control circuit, the secondary cell and the switching circuit.

Since the consumption current through the error amplifier for the overcharge detection circuit is cut under the overdischarge condition, it is possible to suppress the electric power consumption of the battery under the discharge condition and it is possible to prevent the degradation of the battery.

Also, since the consumption current of through the error amplifier for the overcharge circuit is cut, it is possible to suppress the electric power consumption of the battery under the discharge condition and it is possible to prevent the degradation of the battery.

Since a plurality of comparator circuits may be concentrated and integrated, it is possible to reduce the size of the IC chip and the consumption current, and it is possible to provide a battery charge/discharge control circuit with high performance in a low cost.

Also, a current cutting transistor is connected in series with a buffer circuit for detecting a voltage between the cells of the secondary battery provided internally so that the consumption of current may be suppressed. In particular, under the discharged condition that the capability of the secondary cell would be rapidly degraded, it is possible to save the consumption current. Furthermore, by the insertion of the current cutting transistor, it is possible to output a signal representative of the overcharge/overdischarge and regular conditions to the connected cell voltage detection terminal which is an output terminal of the buffer circuit.

Also, with a structure in which the reference voltage source for detecting the overdischarge is commonly used for detecting the overcharge of the secondary cell provided internally, not only is it possible to reduce the number of the components for the charge/discharge control circuit to make the system in a low cost but also it is possible to enhance the service life of the chargeable power supply apparatus by reducing the consumption current through the charge/discharge control circuit in the same manner.

Also, with a structure in which the voltage dividing resistors for detecting the voltage of the secondary cell are used commonly for the overdischarge voltage detection and the overcharge voltage detection, the number of the circuits to be connected in parallel to the secondary cell is reduced to thereby suppress the consumption of current. Also, the consumption of the current through the charge/discharge control circuit is reduced, which leads to the enhancement of the service life of the secondary cell. Also, since the voltage dividing resistors are used commonly for the overcharge and the overdischarge, if the charge/discharge control circuit is concentrated and integrated, it is possible to make the chip compact at a low cost.

As described above, in the charge/discharge control circuit, as soon as the voltage detection circuit detects the overcharge or overdischarge, its detection signal is fed back and the overcharge or overdischarge level is reset for ensuring the detection of the overcharge or overdischarge. It is thus possible to obviate the malfunction. Also, after the reset, the switching circuit between the secondary cell and the charging power source is switched over whereby the unstable oscillation of the voltage detection circuit due to the voltage variation of the secondary cell due to the impedance change of the switching circuit may be avoided advantageously.

With a structure in which a delay circuit is interposed between the overcharge and overdischarge circuit provided internally and the control circuit, it is possible to avoid the malfunction during the detecting operation. Also, it is possible to prevent the malfunction during the initial connection stage of the secondary cell. With the charge/discharge control circuit, the secondary cell and the switching circuit, it is possible to provide a stable power supply apparatus which is stable in operation.

The voltage of the external terminal of the power source apparatus is fed into the charge/discharge control circuit. Even if the voltage of the secondary cell which becomes a power source for charge/discharge control circuit is less than a minimum operable voltage of the charge/discharge control circuit, when the charger is connected thereto, it is possible to control the switching circuit. Accordingly, it is possible to provide a power supply apparatus which is capable of positive charge irrespective of the voltage the secondary cell.

As has been described, according to the present invention, in the charge/discharge control circuit composed of CMOSICs, when the reverse voltage opposite the normal connection is applied to the charge/discharge control circuit, the output of the control circuit turns off the switching circuit to prevent the unlimited operation of the secondary cell.

Also, a latch function is provided to the overcurrent detecting circuit of the charge/discharge control circuit according to the present invention. It is therefore possible to insure the avoidance of the oscillation phenomenon during the overcurrent detection.

In the charge/discharge control circuit according to the present invention, the voltage dividing resistors and the voltage detecting circuit are provided between the terminals to which the voltage sum of the two or more secondary cells connected in series is applied. It is therefore possible to provide a power source apparatus having a long service life.

In the case where the two secondary cells are connected in series with each other and the charge is effected, and even if only one of the secondary cells suffers from defects or accidents to considerably degrade the charging property, the normal cell is only charged to thereby suppress the difference in voltage between the two cells.

Furthermore, the chargeable power source apparatus and the charge/discharge control circuit according to the present invention are composed of integrated components including the switching circuit and thus the following advantages may be enumerated.

(1) Reduction in assembling cost;

(2) Compactness in size; and (3) Enhancement in reliability as a system.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A charge/discharge control circuit comprising:

reference voltage generating means for outputting a reference voltage by receiving a voltage supplied from a battery;

voltage dividing means connected to the battery for dividing a voltage of the battery into a plurality of divided voltages;

error amplifying means for receiving the reference voltage and at least one of the plurality of divided voltage outputs from the voltage dividing means and for amplifying voltages representative of the differences between the reference voltage and the plurality of divided voltages; and current limiting means for limiting a consumption current through the error amplifying means in response to a current limiting signal.

2. The charge/discharge control circuit according to claim 1; wherein the error amplifying means comprises a multi-input error amplifier, and the current limiting means comprises a current limiting transistor connected in series with the multi-input error amplifier.

3. The charge/discharge control circuit according to claim 1; wherein the error amplifying means comprises a plurality of error amplifiers for receiving the reference voltage and the plurality of divided voltages.

4. The charge/discharge control circuit according to claim 1; wherein the error amplifying means comprises a plurality of error amplifiers for receiving the reference voltage and the plurality of divided voltages, respectively, and the current limiting means comprises a common current limiting transistor connected in series with the plurality of error amplifiers.

* * * * *